(12) United States Patent
Taniyama et al.

(10) Patent No.: US 10,447,001 B2
(45) Date of Patent: Oct. 15, 2019

(54) LASER UNIT

(71) Applicant: GIGAPHOTON INC., Tochigi (JP)

(72) Inventors: Minoru Taniyama, Tochigi (JP);
Hakaru Mizoguchi, Tochigi (JP);
Osamu Wakabayashi, Tochigi (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/858,219

(22) Filed: Dec. 29, 2017

(65) Prior Publication Data
US 2018/0123308 A1 May 3, 2018

Related U.S. Application Data

(63) Continuation of application No. PCT/JP2015/073252, filed on Aug. 19, 2015.

(51) Int. Cl.
*H01S 3/038* (2006.01)
*H01S 3/086* (2006.01)
(Continued)

(52) U.S. Cl.
CPC ............ *H01S 3/038* (2013.01); *H01S 3/0385* (2013.01); *H01S 3/086* (2013.01);
(Continued)

(58) Field of Classification Search
CPC .... H01S 3/0385; H01S 3/08059; H01S 3/136; H01S 3/086; H01S 3/0971;
(Continued)

(56) References Cited

U.S. PATENT DOCUMENTS 4,851,978 A * 7/1989 Ichihara ............ G03F 7/70058
362/268
5,048,048 A * 9/1991 Nishimae ............... H01S 3/03
372/64

(Continued)

FOREIGN PATENT DOCUMENTS

CN 1849732 A 10/2006
CN 102549855 7/2012
(Continued)

OTHER PUBLICATIONS

International Search Report issued in PCT/JP2015/073252; dated Nov. 2, 2015.
(Continued)

*Primary Examiner* — Joshua King
(74) *Attorney, Agent, or Firm* — Studebaker & Brackett PC

(57) ABSTRACT

A laser unit may include a laser chamber including a pair of discharge electrodes that are opposed to each other in a first direction with an electrode gap interposed in between and are configured to provide a discharge width in a second direction, orthogonal to the first direction, smaller than the electrode gap; and an optical resonator including a first optical member and a second optical member that are opposed to each other in a third direction orthogonal to both the first direction and the second direction with the discharge electrodes interposed in between, and configured to amplify laser light generated between the discharge electrodes and output amplified laser light, the optical resonator satisfying the following expression to configure a stable resonator in the second direction:

$0 < G1 \cdot G2 < 1$ where G1 is a G parameter of the first optical member, and G2 is a G parameter of the second optical member.

17 Claims, 19 Drawing Sheets

(51) Int. Cl.
*H01S 3/104* (2006.01)
*H01S 3/134* (2006.01)
*H01S 3/08* (2006.01)
*H01S 3/136* (2006.01)
*H01S 3/0971* (2006.01)
*H01S 3/223* (2006.01)
*H01S 3/225* (2006.01)
*H01S 3/23* (2006.01)
*H01S 3/00* (2006.01)

(52) U.S. Cl.
CPC .......... *H01S 3/08059* (2013.01); *H01S 3/104* (2013.01); *H01S 3/134* (2013.01); *H01S 3/136* (2013.01); *H01S 3/005* (2013.01); *H01S 3/0071* (2013.01); *H01S 3/0804* (2013.01); *H01S 3/0971* (2013.01); *H01S 3/223* (2013.01); *H01S 3/225* (2013.01); *H01S 3/2308* (2013.01); *H01S 2301/20* (2013.01)

(58) Field of Classification Search
CPC ..... H01S 2301/20; H01S 3/0804–0805; H01S 3/139–1398; H01S 3/105–1055; H01S 3/038–0388
See application file for complete search history.

(56) References Cited

U.S. PATENT DOCUMENTS

| | | | | |
|---|---|---|---|---|
| 5,307,207 | A * | 4/1994 | Ichihara | G02B 26/10 353/122 |
| 5,506,858 | A | 4/1996 | Takenaka et al. | |
| 5,534,970 | A * | 7/1996 | Nakashima | G03F 7/70075 353/122 |
| 5,535,233 | A * | 7/1996 | Mizoguchi | H01S 3/03 372/87 |
| 5,586,139 | A | 12/1996 | Takenaka et al. | |
| 6,285,440 | B1 * | 9/2001 | Takahashi | G03F 7/70075 355/67 |
| 7,756,183 | B2 | 7/2010 | Wakabayashi | H01S 3/08009 372/20 |
| 8,611,393 | B2 * | 12/2013 | Fujimoto | H01S 3/106 372/100 |
| 8,675,697 | B2 * | 3/2014 | Tanaka | H01S 3/10 372/102 |
| 2005/0185691 | A1 | 8/2005 | Slater | |
| 2007/0014326 | A1 * | 1/2007 | Wakabayashi | H01S 3/08009 372/92 |
| 2008/0181262 | A1 | 7/2008 | Wakabayashi et al. | |
| 2008/0198891 | A1 * | 8/2008 | Hori | H01S 3/036 372/61 |
| 2009/0067468 | A1 * | 3/2009 | Brown | G03F 7/70583 372/55 |
| 2012/0182604 | A1 | 7/2012 | Fujikawa et al. | |
| 2013/0279526 | A1 * | 10/2013 | Kakizaki | H01S 3/10 372/5 |
| 2014/0307244 | A1 | 10/2014 | Wakabayashi et al. | |
| 2016/0190763 | A1 * | 6/2016 | Kakizaki | H01S 3/038 372/38.05 |

FOREIGN PATENT DOCUMENTS

| | | | |
|---|---|---|---|
| JP | H01-259533 A | | 10/1989 |
| JP | 02098919 A | * | 4/1990 |
| JP | H02-098919 A | | 4/1990 |
| JP | H06-188491 A | | 7/1994 |
| JP | 2000-150998 A | | 5/2000 |
| JP | 2007-012805 A | | 1/2007 |
| JP | 2007-300008 A | | 11/2007 |
| JP | 2007300008 A | * | 11/2007 |
| JP | 2008-016544 A | | 1/2008 |
| JP | 2008-277616 A | | 11/2008 |
| JP | 2008-277617 A | | 11/2008 |
| JP | 2008-277618 A | | 11/2008 |
| JP | 2012-151495 A | | 8/2012 |
| WO | WO-2009019006 A2 * | 2/2009 | ......... A61F 9/00804 |
| WO | WO-2009145107 A1 * | 12/2009 | ........... H01S 3/0804 |

OTHER PUBLICATIONS

International Preliminary Report on Patentability; issued in PCT/JP2015/073252; dated Feb. 20, 2018.

An Office Action mailed by the Japanese Patent Office dated Jun. 25, 2019, which corresponds to Japanese Patent Application No. 2017-535192 and is related to U.S. Appl. No. 15/858,219; with English Translation.

An Office Action mailed by the State Intellectual Property Office dated Aug. 5, 2019, which corresponds to Chinese Patent Application No. 201580081476.5 and is related to U.S. Appl. No. 15/858,219; with English Translation.

* cited by examiner

LASER UNIT

CROSS REFERENCE TO RELATED APPLICATIONS

The present application is a continuation application of International Application No. PCT/JP2015/073252 filed on Aug. 19, 2015. The content of the application is incorporated herein by reference in its entirety.

BACKGROUND

1. Technical Field

The present disclosure relates to a laser unit.

2. Related Art

With miniaturization and high integration of a semiconductor integrated circuit, an improvement in resolution has been demanded for a semiconductor exposure apparatus. Hereinafter, the semiconductor exposure apparatus is simply referred to as an "exposure apparatus". Shortening in a wavelength of light to be outputted from an exposure light source has been in progress accordingly. A gas laser unit is used in place of an existing mercury lamp for the exposure light source. Currently, a KrF excimer laser unit and an ArF excimer laser unit may be used as gas laser units for exposure. The KrF excimer laser unit may output ultraviolet light with a wavelength of 248 nm, and the ArF excimer laser unit may output ultraviolet light with a wavelength of about 193.4 nm.

As current exposure technology, liquid immersion exposure is practically used. In the liquid immersion exposure, a clearance between a projection lens on exposure apparatus side and a wafer is filled with a liquid to change a refractive index of the clearance, thereby shortening an apparent wavelength of light from the exposure light source. When the liquid immersion exposure is performed with use of the ArF excimer laser unit as the exposure light source, ultraviolet light with a wavelength of 134 nm in water is applied to the wafer. This technology is referred to as "ArF liquid immersion exposure". The ArF liquid immersion exposure is also referred to as "ArF liquid immersion lithography".

Since a spectral line width in free oscillation of each of the KrF excimer laser unit and the ArF excimer laser unit is wide, e.g., in a range from about 350 pm to about 400 pm, color aberration of laser light (ultraviolet light) that is reduced and projected on the wafer by the projection lens on the exposure apparatus side occurs, which results in decrease in resolution. It is therefore necessary to narrow a spectral line width of laser light to be outputted from the gas laser unit to an extent in which the color aberration is negligible. The spectral line width is also referred to as "spectral width". Accordingly, a line narrow module including a line narrowing device is provided in a laser resonator of the gas laser unit, which achieves narrowing of the spectral width. Non-limiting examples of the line narrowing device may include an etalon and a grating. The laser unit narrowed in spectral width in this way is referred to as "line narrowing laser unit".

Moreover, in recent years, laser annealing has been as one of techniques of crystallizing an amorphous film provided on a glass substrate or a silicon substrate to form a polycrystalline film. Laser annealing may involve, for example, pulse irradiation, with laser light, of an amorphous silicon film provided on a silicon substrate to form a polycrystalline silicon film, with use of a laser annealing apparatus equipped with an excimer laser, etc. Forming a polycrystalline silicon film in this way may allow for formation of thin film transistors. A substrate with thin film transistors formed in this way may be used for liquid crystal displays, etc. A KrF excimer laser unit, a XeCl excimer laser unit, and a XeF excimer laser unit may be used as light sources for the laser annealing apparatus. Laser annealing may be performed by irradiation of an amorphous silicon film with laser light in free oscillation. For example, reference is made to Japanese Unexamined Patent Application Publication No. 2007-012805, Japanese Unexamined Patent Application Publication No. H02-098919, Japanese Unexamined Patent Application Publication No. 2000-150998, Japanese Unexamined Patent Application Publication No. 2008-277616, Japanese Unexamined Patent Application Publication No. 2008-277617, and Japanese Unexamined Patent Application Publication No. 2008-277618.

SUMMARY

A laser unit according to an aspect of the present disclosure may include: a laser chamber including a pair of discharge electrodes that are opposed to each other in a first direction with an electrode gap interposed in between and are configured to provide a discharge width in a second direction smaller than the electrode gap, the second direction being orthogonal to the first direction; and an optical resonator including a first optical member and a second optical member, and configured to amplify laser light generated between the discharge electrodes and output amplified laser light, the first optical member and the second optical member that are opposed to each other in a third direction orthogonal to both the first direction and the second direction with the discharge electrodes interposed in between, and the optical resonator satisfying the following expression to configure a stable resonator in the second direction:

$$0 < G1 \cdot G2 < 1$$

where G1 is a G parameter of the first optical member, and G2 is a G parameter of the second optical member.

A laser unit according to an aspect of the present disclosure may include: a laser chamber including a pair of discharge electrodes that are opposed to each other in a first direction with an electrode gap interposed in between and are configured to provide a discharge width in a second direction smaller than the electrode gap, the second direction being orthogonal to the first direction; and an optical resonator including a first optical member and a second optical member that are opposed to each other in a third direction orthogonal to both the first direction and the second direction with the discharge electrodes interposed in between, and configured to be a stable resonator in the second direction, the optical resonator being configured to amplify laser light generated between the discharge electrodes and output, toward an optical system, amplified laser light that involves a spatial coherent length of P/M or less in the second direction, and the optical system being configured to expand a beam width of the amplified laser light in the second direction and cause the amplified laser light that involves an expanded beam width to enter a fly-eye lens including a plurality of lenses, where M is an expansion magnification of the beam width of the amplified laser light, and P is an array pitch of the lenses in the fly-eye lens.

BRIEF DESCRIPTION OF THE DRAWINGS

Some example embodiments of the present disclosure are described below as mere examples with reference to the accompanying drawings.

DETAILED DESCRIPTION

Figure 1:
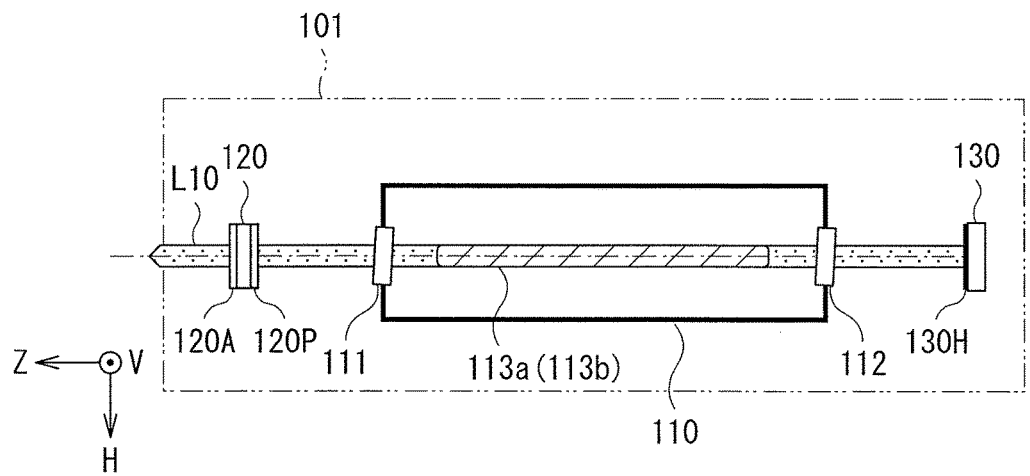
FIG. 1 schematically illustrates a cross-sectional configuration example in an H-axis direction of a laser unit according to a comparative example.

<Contents>
[1. Comparative Example] (a laser unit including an optical resonator that uses two surface mirrors)
   1.1 Configuration (FIGS. 1 to 3)
   1.2 Operation
   1.3 Issues (FIGS. 4 to 7)
[2. First Embodiment] (a laser unit including an optical resonator that uses two cylindrical mirrors)
   2.1 Configuration (FIGS. 8 to 10)
   2.2 Operation (FIGS. 11 and 12)
   2.3 Workings and Effects
[3. Second Embodiment] (a laser unit including a spatial coherence adjuster)
   3.1 Configuration (FIGS. 13 and 14)
   3.2 Operation (FIGS. 15 and 16)
   3.3 Workings and Effects
   3.4 Modification Examples (FIG. 17)
[4. Third Embodiment] (a laser system including an MO and a PA)
   4.1 Configuration (FIGS. 18 and 19)
   4.2 Operation
   4.3 Workings and Effects
[5. Fourth Embodiment] (a control system for spatial coherence)
   5.1 Configuration (FIG. 20)
   5.2 Operation (FIG. 21)
   5.3 Workings and Effects
[6. Variations of Components and Specific Examples of Components]
   6.1 Variations of Stable Resonator (FIGS. 22 to 24)
   6.2 Specific Example of Annealing Apparatus (FIG. 25)
   6.3 Specific Example of Coherence Monitor (FIGS. 26 and 27)
   6.4 Variation of Discharge Electrodes (FIG. 28)
[7. Hardware Environment of Controller] (FIG. 29)
[8. Et Cetera]

In the following, some example embodiments of the present disclosure are described in detail with reference to the drawings. Example embodiments described below each illustrate one example of the present disclosure and are not intended to limit the contents of the present disclosure. Further, all of the configurations and operations described in each example embodiment are not necessarily essential for the configurations and operations of the present disclosure. Note that like components are denoted by like reference numerals, and redundant description thereof is omitted.

[1. Comparative Example]

(1.1 Configuration)

Figure 2:
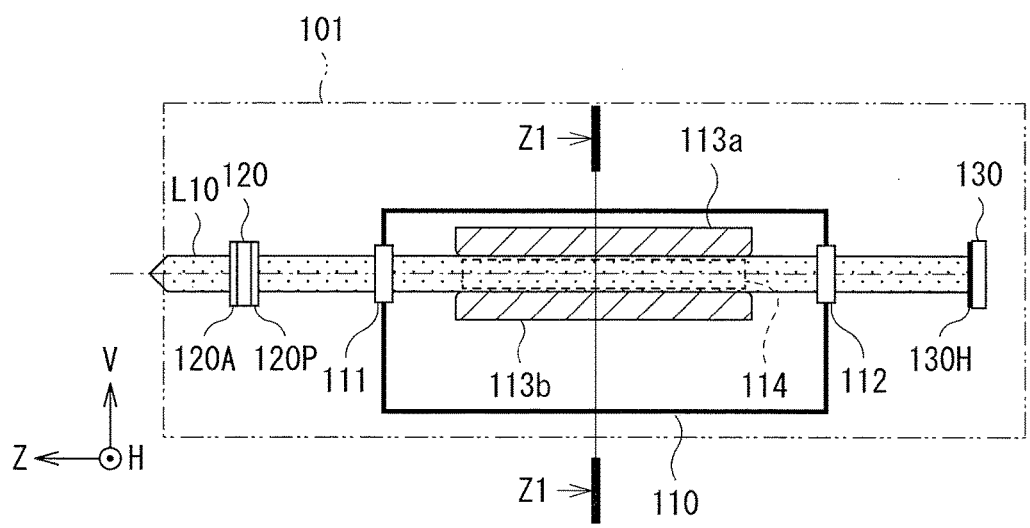
FIG. 2 schematically illustrates a cross-sectional configuration example in a V-axis direction of the laser unit according to the comparative example.
Figure 3:
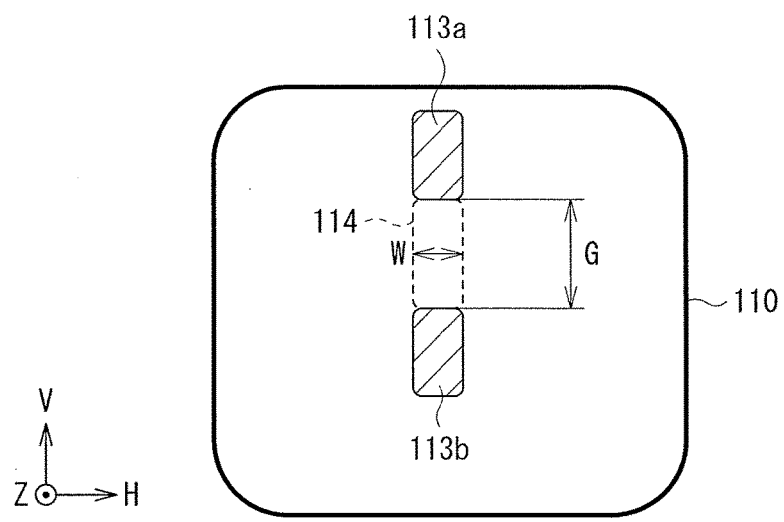
FIG. 3 schematically illustrates a diagram, viewed along arrows Z1-Z1 of FIG. 2, of the laser unit illustrated in FIG. 2.

FIG. 1 schematically illustrates a cross-sectional configuration example in an H-axis direction of a laser unit according to a comparative example with respect to example embodiments of the present disclosure. FIG. 2 schematically illustrates a cross-sectional configuration example in a V-axis direction of the laser unit according to the comparative example. Moreover, FIG. 3 schematically illustrates a diagram, viewed along arrows Z1-Z1 of FIG. 2, of the laser unit illustrated in FIG. 2.

In the present specification, the V-axis direction, the H-axis direction, and a Z-axis direction may respectively correspond to a first direction, a second direction, and a third direction. The H-axis direction may be a direction substantially orthogonal to the V-axis direction. The Z-axis direction may be a direction substantially orthogonal to both the V-axis direction and the H-axis direction. The V-axis direction may be a direction substantially orthogonal to a paper sheet in FIG. 1. The H-axis direction may be a direction substantially parallel to an upward-downward direction of the paper sheet in FIG. 1. The Z-axis direction may be a direction substantially parallel to a rightward-leftward direction of the paper sheet in FIG. 1.

A laser unit 101 according to the comparative example may include a chamber 110 serving as a laser chamber, an output coupling mirror 120, and a rear mirror 130. The chamber 110 may include a first window 111, a second window 112, and a pair of discharge electrodes 113a and 113b. The output coupling mirror 120 and the rear mirror 130 may be opposed to each other in the Z-axis direction with the discharge electrodes 113a and 113b interposed in between, and may configure an optical resonator that amplifies pulsed laser light generated between the discharge electrodes 113a and 113B and outputs amplified laser light. The chamber 110 may be disposed in an optical path of the optical resonator.

The chamber 110 may contain, for example, an excimer laser gas as a laser gas. The chamber 110 may contain, as the laser gas, for example, one or more of an Ar gas, a Kr gas, and a Xe gas as a rare gas, one or both of a fluorine gas and a chlorine gas as a halogen gas, and one or both of a Ne gas and a He gas as a buffer gas.

The output coupling mirror 120 may include a planar substrate that allows laser light to pass therethrough. One surface and the other surface of the planar substrate of the output coupling mirror 120 may be respectively coated with an anti-reflection film (AR film) 120A and a partial reflection film (PR film) 120P. The output coupling mirror 120 may be so disposed as to allow the surface coated with the AR film 120A to be directed toward output side of pulsed laser light L10 and as to allow the surface coated with the PR film 120P to be directed toward the chamber 110.

The rear mirror 130 may include a planar substrate having a surface coated with a high reflection film (HR film) 130H, that is, a reflection surface. The rear mirror 130 may be so disposed as to allow the surface coated with the HR film 130H to be directed toward the chamber 110.

The discharge electrodes 113a and 113b may be opposed to each other to allow a longitudinal direction thereof to be parallel to the Z-axis direction, as illustrated in FIG. 3. Moreover, the discharge electrodes 113a and 113b may be opposed to each other in the V-axis direction with an electrode gap G interposed in between. A discharge width W of a discharge region 114 provided by the discharge electrodes 113a and 113b may be smaller than the electrode gap G. In other words, G>W may be established. The electrode gap G may be in a range from 12 mm to 35 mm both inclusive. The discharge width W may be in a range from 2 mm to 20 mm both inclusive. For example, each of the electrode gap G and the discharge width W may have one of the following values.

W=one of 2 mm, 6 mm, 10 mm, 14 mm, 18 mm, and 20 mm

G=one of 12 mm, 15 mm, 18 mm, 21 mm, 24 mm, 28 mm, 32 mm, and 35 mm

Moreover, a combination of the value of the electrode gap G and the value of the discharge width W may be, for example, W≅4 mm and G≅16 mm.

(1.2 Operation)

In the laser unit 101, application of a pulsed high voltage between the discharge electrodes 113a and 113b by an unillustrated power source may cause discharge between the discharge electrodes 113a and 113b. In the discharge region 114 in which the discharge is caused, the laser gas contained in the chamber 110 may be excited by the discharge, which causes generation of ultraviolet light. The ultraviolet light may be amplified and be subjected to laser oscillation by the optical resonator.

The laser oscillation may cause the output coupling mirror 120 to output pulsed laser light L10. Characteristics of the pulsed laser light L10 may be determined by a configuration of the optical resonator, the discharge width W, and the electrode gap G. A beam shape of the outputted pulsed laser light L10 may be, for example, a shape that is long in the V-axis direction, that is, a direction of the electrode gap G and short in the H-axis direction, that is, a direction of the discharge width W. The discharge width W here may be defined as a width in the H-axis direction of the discharge region 114 at a substantially halfway point in the V-axis direction of the electrode gap G. Moreover, a position in the Z-axis direction of the discharge width W may be located at a substantially halfway point in the Z-axis direction of the discharge electrodes 113a and 113b indicated by a line between the arrows Z1-Z1, as illustrated in FIG. 2.

(1.3 Issues)

In the laser unit 101 according to the comparative example, spatial coherence lengths Xc in the H-axis direction and the V-axis direction of the pulsed laser light L10 to be outputted may be different from each other.

Figure 4:
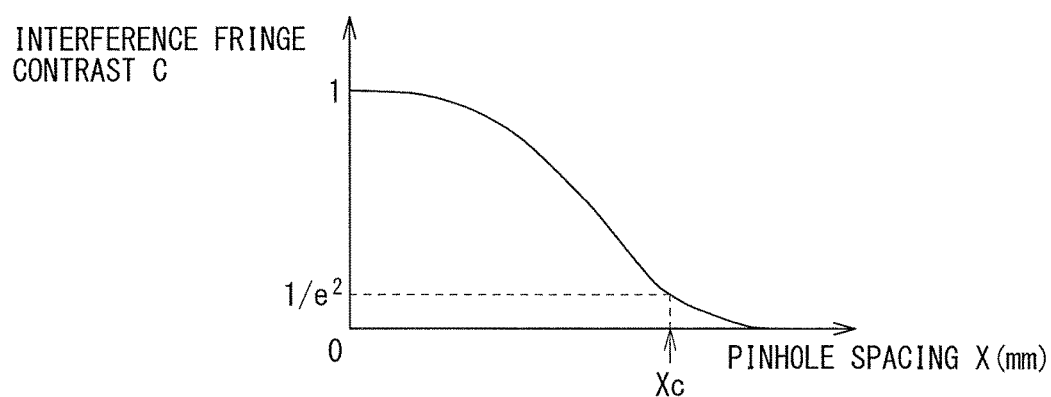
FIG. 4 schematically illustrates an example of a spatial coherent length.
Figure 5:
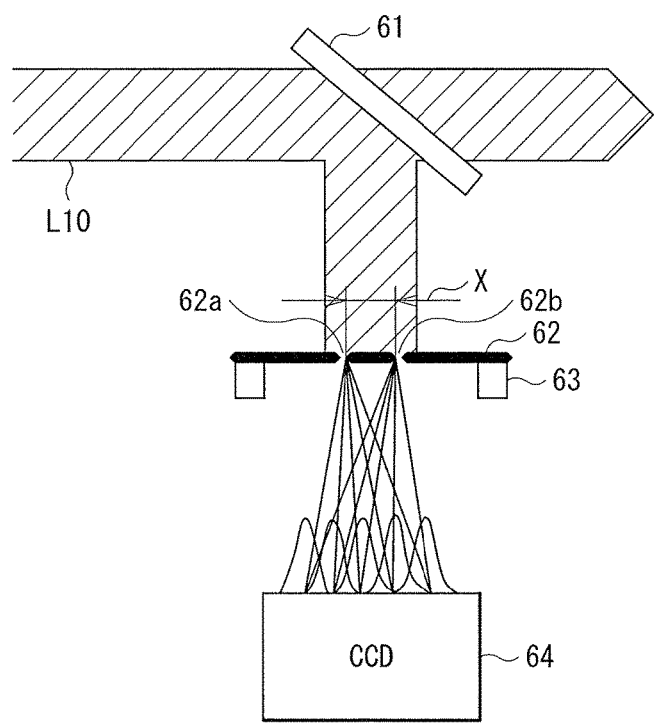
FIG. 5 schematically illustrates an example of a coherence monitor that measures a spatial coherent length.
Figure 6:
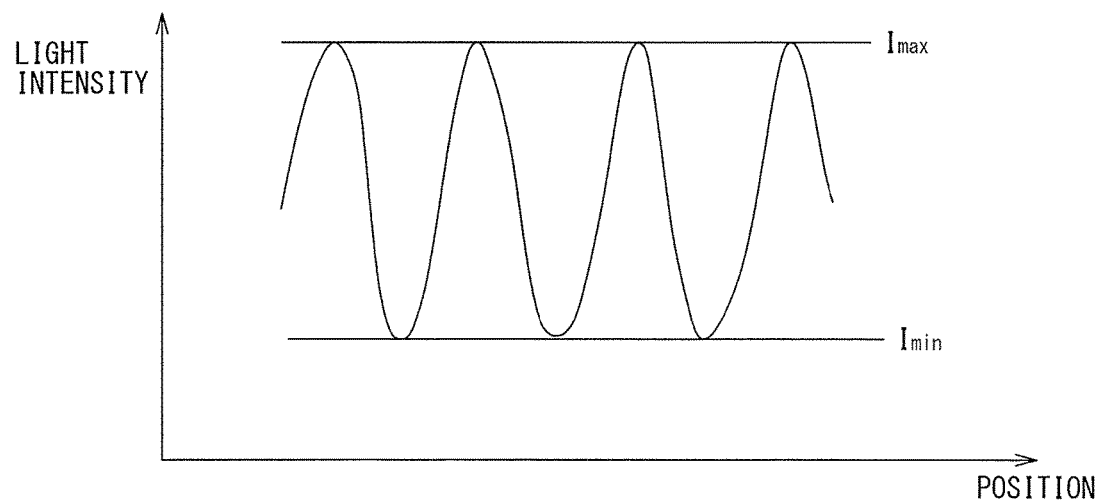
FIG. 6 schematically illustrates an example of a profile of an interference fringe measured by the coherence monitor illustrated in FIG. 5.

In the following, description is given of definition of the spatial coherent length Xc. FIG. 4 schematically illustrates an example of the spatial coherent length Xc. FIG. 5 schematically illustrates an example of a coherence monitor that measures the spatial coherent length Xc. FIG. 6 schematically illustrates an example of a profile of an interference fringe measured by the coherence monitor illustrated in FIG. 5.

The coherence monitor may include a beam splitter 61, a pinhole substrate 62, and a charge coupled device (CCD) camera 64. The beam splitter 61 may be disposed in an optical path of the pulsed laser light L10 to be measured. The pinhole substrate 62 may have two pinholes 62a and 62b with a pinhole spacing X in between. A rotation stage 63 may be mounted to the pinhole substrate 62. Directions of the two pinholes 62a and 62b may be adjustable by the rotation stage 63. For example, an axis including centers of the two pinholes 62a and 62b may be adjustable in the H-axis direction and the V-axis direction. Moreover, a plurality of pinhole substrates that differ in the pinhole spacing X may be prepared, and the coherence monitor may measure interference fringes for different pinhole spacings X.

The CCD camera 64 may be so disposed as to allow for measurement of the interference fringe generated by light having passed through the two pinholes 62a and 62b. The pinhole spacing X may satisfy a predetermined relationship with an array pitch in a fly-eye lens 72 of an illumination optical system 73 and an expansion magnification M of a beam expander 70 in an annealing apparatus 12 illustrated in FIGS. 26 and 27 to be described later.

A value of interference fringe contrast C may vary by a value of the pinhole spacing X as illustrated in FIG. 4, where a horizontal axis indicates the pinhole spacing X and a vertical axis indicates the interference fringe contrast C measured by the CCD camera 64. The interference fringe contrast C may be calculated by the following expression as illustrated in FIG. 6, where Imin is a minimal value of the interference fringe and Imax is a maximal value of the interference fringe.

$$C=(Imax-Imin)/(Imax+Imin)$$

The pinhole spacing X in a case where the interference fringe contrast C is $1/e^2$ may be the spatial coherence length Xc, as illustrated in FIG. 4.

Figure 7:
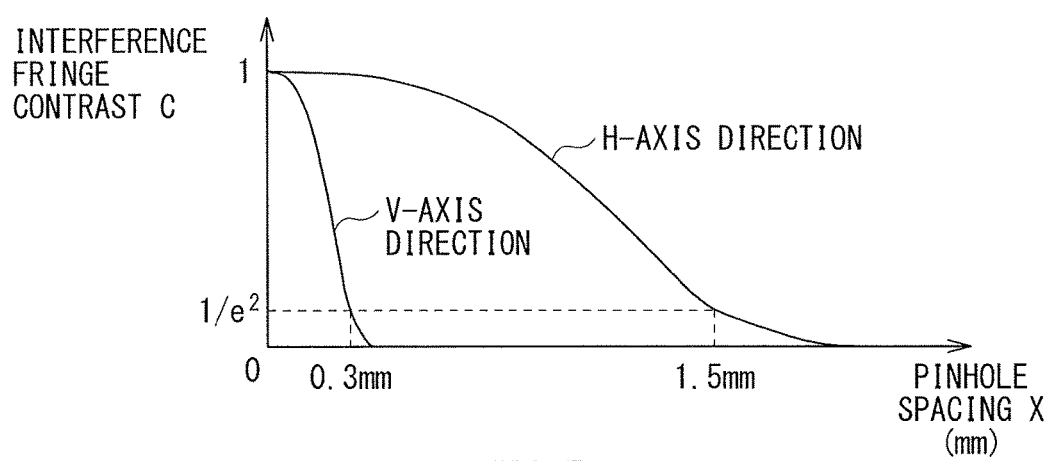
FIG. 7 schematically illustrates an example of results of measurement of spatial coherence lengths in the H-axis direction and the V-axis direction of laser light outputted from the laser unit according to the comparative example.

FIG. 7 schematically illustrates an example of results of measurement of the spatial coherent lengths Xc in the H-axis direction and the V-axis direction of the pulsed laser light L10 outputted from the laser unit 101 according to the comparative example. The pulsed laser light L10 outputted from the laser unit 101 may have different spatial coherent lengths Xc in the H-axis direction and the V-axis direction. Measurement conditions in FIG. 7 are as follows.

(Measurement Conditions)
Optical Resonator
    Output coupling mirror 120: surface mirror
    Rear mirror 130: surface mirror
Discharge Electrodes 113a and 113b
    Electrode gap G=16 mm
    Discharge width W=4 mm Coherence in the H-axis direction is higher than coherence in the V-axis direction, and the interference fringe contrast C may be high, as illustrated in FIG. 7. The spatial coherent length Xc in the case where the interference fringe contrast C is $1/e^2$ is about 0.3 mm in the V-axis direction and about 1.5 mm in the H-axis direction.

In general, in an illumination optical system such as an exposure apparatus and an annealing apparatus, a fly-eye lens is frequently used to make a beam uniform. Narrowing the array pitch in the fly-eye lens may result in increase in uniformity. However, in a case where the spatial coherent length Xc of outputted pulsed laser light is longer than the array pitch, an interference fringe may be generated. Accordingly, an interference fringe having contrast C larger in the H-axis direction than in the V-axis direction may be generated. Hence, amorphous silicon on a substrate may be irradiated with laser beams in which the interference fringe is generated. As a result, a thus-generated crystal may have nonuniform performance.

[2. First Embodiment]

Next, description is given of a laser unit according to a first embodiment of the present disclosure. Note that substantially same components as the components of the laser unit according to the foregoing comparative example are denoted by same reference numerals, and redundant description thereof is omitted.

(2.1 Configuration)

Figure 8:
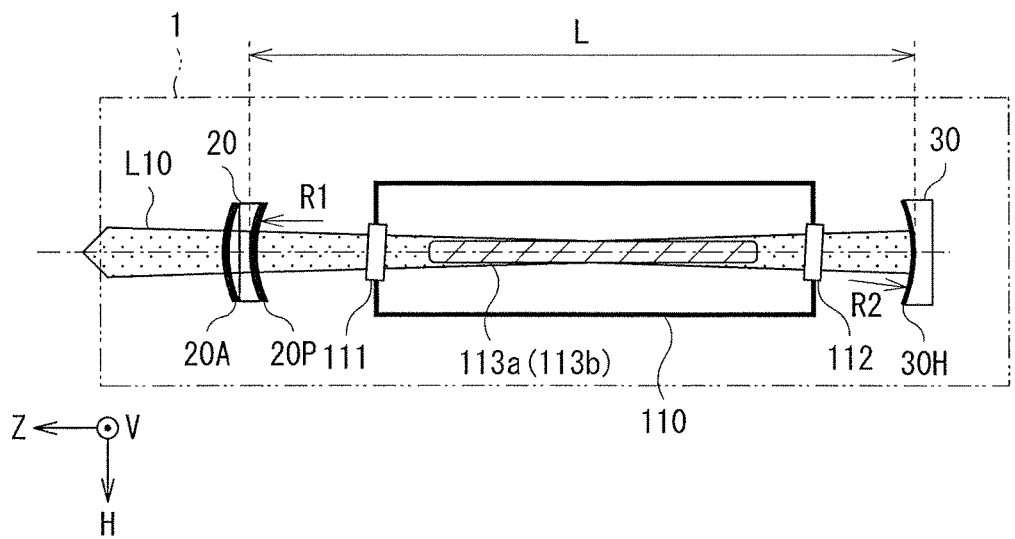
FIG. 8 schematically illustrates a cross-sectional configuration example in the H-axis direction of a laser unit according to a first embodiment.
Figure 9:
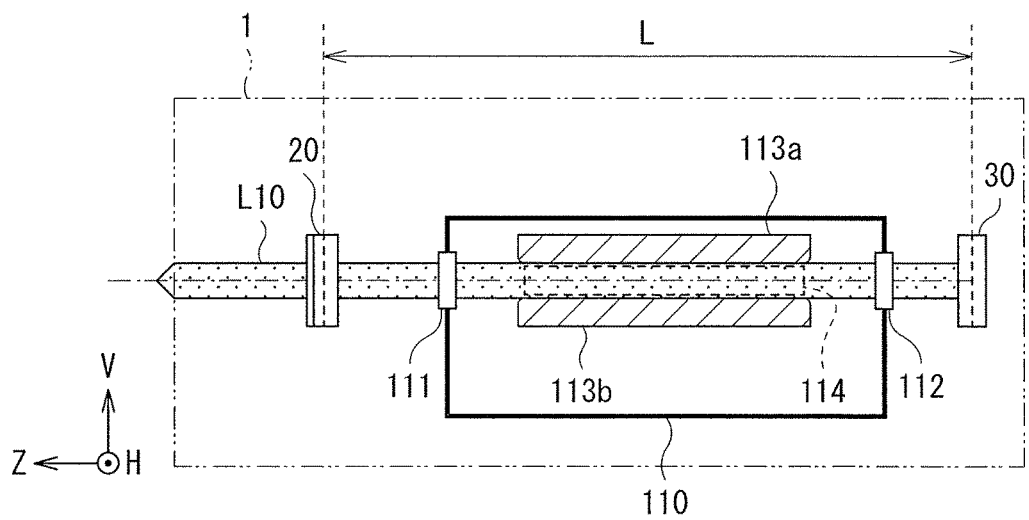
FIG. 9 schematically illustrates a cross-sectional configuration example in the V-axis direction of the laser unit according to the first embodiment.

FIG. 8 schematically illustrates a cross-sectional configuration example in the H-axis direction of a laser unit 1 according to the first embodiment of the present disclosure. FIG. 9 schematically illustrates a cross-sectional configuration example in the V-axis direction of the laser unit 1 according to the first embodiment of the present disclosure.

The laser unit 1 according to the present embodiment may include an output coupling mirror 20 and a rear mirror 30 in place of the output coupling mirror 120 and the rear mirror 130 in the laser unit 101 according to the foregoing comparative example. In the laser unit 1, the output coupling mirror 20 may correspond to a first optical member, and the rear mirror 30 may correspond to a second optical member.

The output coupling mirror 20 and the rear mirror 30 may be opposed to each other in the Z-axis direction with the discharge electrodes 113a and 113b interposed in between, and may configure an optical resonator that amplifies pulsed laser light generated between the discharge electrodes 113a and 113b and outputs amplified pulsed laser light.

The output coupling mirror 20 and the rear mirror 30 may be so disposed as to allow the optical resonator to serve as a stable resonator in the H-axis direction.

The output coupling mirror 20 may be a cylindrical partial reflection mirror having a curvature in the H-axis direction. The output coupling mirror 20 may include a cylindrical substrate that allows laser light to pass therethrough. One surface and the other surface of the output coupling mirror 20 may be respectively coated with an AR film 20A, and a PR film 20P. The output coupling mirror 20 may be so disposed as to allow the surface coated with the AR film 20A to be directed toward the output side of the pulsed laser light L10 and as to allow the surface coated with the PR film 20P to be directed toward the chamber 110. The surface coated with the PR film 20P of the output coupling mirror 20 may be a cylindrical surface having a curvature radius R1 that is concave toward the chamber 110. The surface coated with the AR film 20A may be a cylindrical surface that is convex toward the output side of the pulsed laser light L10. The output coupling mirror 20 may be so disposed as to allow a central axis of the curvature radius R1 to be substantially parallel to the V-axis direction and substantially coincident with an optical path axis of the optical resonator.

The rear mirror 30 may be a cylindrical high reflection mirror having a curvature in the H-axis direction. The rear mirror 130 may include a cylindrical substrate having a surface coated with an HR film 30H, that is, a reflection surface. The rear mirror 30 may be so disposed as to allow the surface coated with the HR film 30H to be directed toward the chamber 110. The surface coated with the HR film 30H of the rear mirror 30 may be a cylindrical surface having a curvature radius R2 that is concave toward the chamber 110. The rear mirror 30 may be so disposed as to allow a central axis of the curvature radius R2 to be substantially parallel to the V-axis direction and substantially coincident with the optical path axis of the optical resonator.

The optical resonator satisfying the following expression (1) may configure a stable resonator in the H-axis direction, where G1 is a G parameter of the output coupling mirror 20 as the first optical member, and G2 is a G parameter of the rear mirror 30 as the second optical member.

$$0<G1 \cdot G2<1 \tag{1}$$

where G1=1−L/R, G2=1−L/R2, and L is a resonator length.

Figure 10:
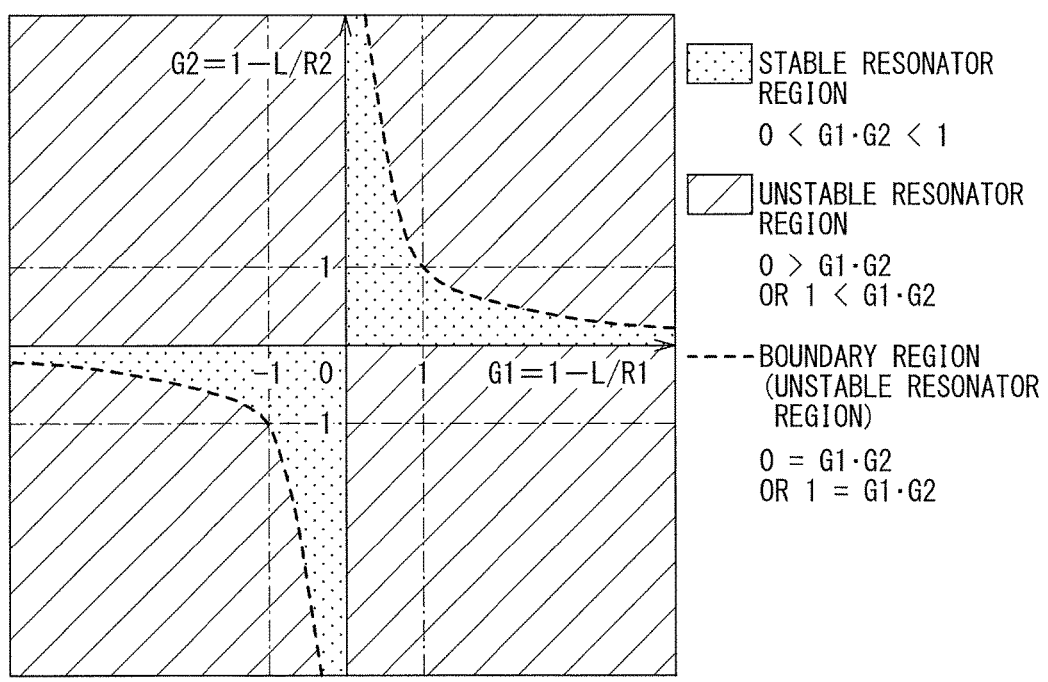
FIG. 10 schematically illustrates a region of a stable resonator determined by G parameters of an optical resonator.

FIG. 10 schematically illustrates a region of the stable resonator determined by the G parameters of the optical resonator. In FIG. 10, a horizontal axis indicates the G parameter G1, and a vertical axis indicates the G parameter G2. A typical condition of the stable resonator may be as indicated by a halftone dot region illustrated in FIG. 10.

Moreover, a diagonally shaded region illustrated in FIG. 10 is an unstable resonator region, which satisfies the following condition.

$$0 > G1 \cdot G2 \text{ or } 1 < G1 \cdot G2$$

Further, a boundary region satisfying $0 = G1 \cdot G2$ or $1 = G1 \cdot G2$ is present, and the boundary region herein is defined as the unstable resonator region.

Other configurations may be substantially similar to those of the laser unit 101 according to the foregoing comparative example.

(2.2 Operation)

Figure 11:
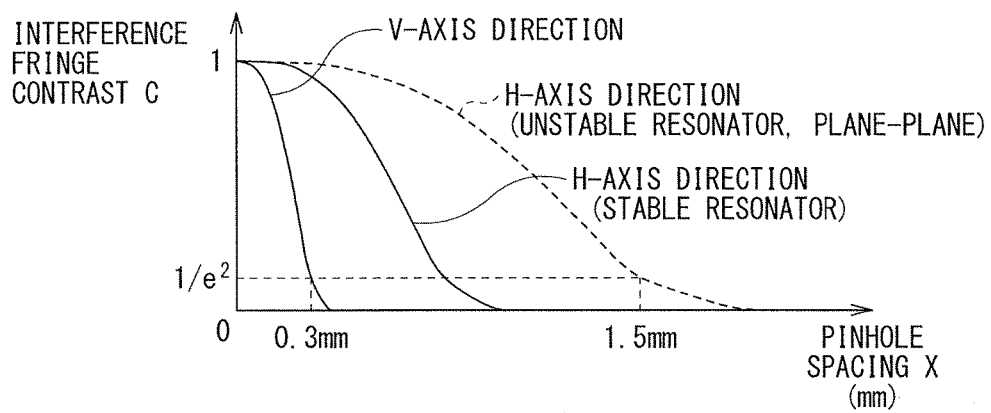
FIG. 11 schematically illustrates an example of results of measurement of spatial coherent lengths in the H-axis direction and the V-axis direction of laser light outputted from the laser unit according to the first embodiment.

FIG. 11 schematically illustrates an example of results of measurement of spatial coherent lengths Xc in the H-axis direction and the V-axis direction of the pulsed laser light L10 outputted from the laser unit 1. In FIG. 11, "H-AXIS DIRECTION (UNSTABLE RESONATOR, PLANE-PLANE)" indicates characteristics in the H-axis direction in the laser unit 101 according to the comparative example, and "H-AXIS DIRECTION (STABLE RESONATOR)" indicates characteristics in the H-axis direction in the laser unit 1 according to the present embodiment.

The laser unit 1 serves as a stable resonator in the H-axis direction, as compared with the laser unit 101 according to the foregoing comparative example, which causes an increase in the number of transverse modes. As a result, the number of light sources in the H-axis direction may increase, and spatial coherence may decrease.

The laser unit 1 serves as a plane-plane optical resonator in the V-axis direction as with the laser unit 101 according to the foregoing comparative example; therefore, it is difficult to vary the number of transverse modes. As a result, an electrode gap G is large as illustrated in FIG. 11, which may cause the number of light sources in the V-axis direction to be kept large, and may cause spatial coherence to be kept low.

Figure 12:
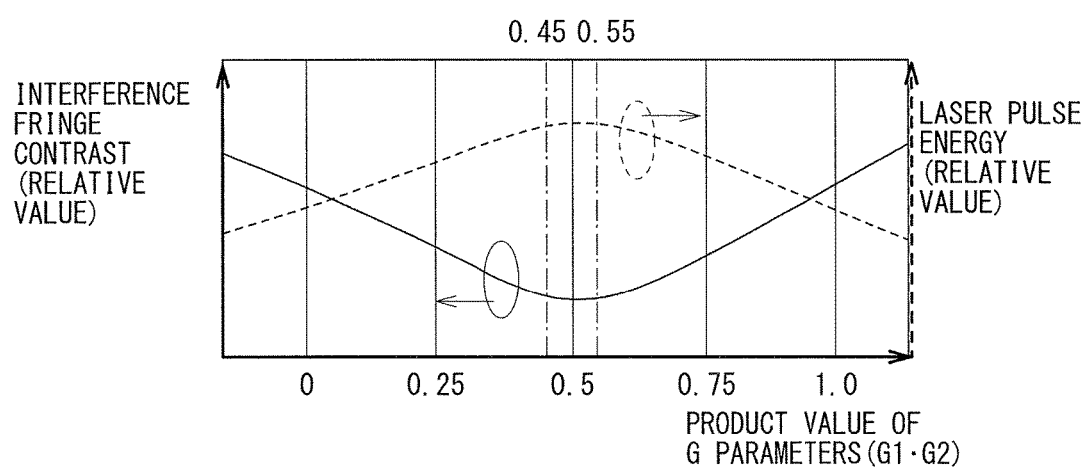
FIG. 12 schematically illustrates an example of a relationship between a product value of G parameters and both interference fringe contrast and laser pulse energy.

FIG. 12 schematically illustrates an example of a relationship between a product value (G1·G2) of the G parameters and both a relative value of interference fringe contrast C and a relative value of laser pulse energy. The interference fringe contrast C has a value in a case where a pinhole spacing X is fixed.

The interference fringe contrast C may monotonically decrease in a range in which the product value (G1·G2) of the G parameters is from a negative value to around 0.5, and may reach a minimum value at the product value (G1·G2) of around 0.5. As the product value (G1·G2) of the G parameters increases from around 0.5, the interference fringe contrast C may monotonically increase.

In contrast, the relative value of laser pulse energy outputted from the optical resonator may monotonically increase in a range in which the product value (G1·G2) of the G parameters is from the negative value to around 0.5, and may reach a maximum value at the product value (G1·G2) of around 0.5. As the product value (G1·G2) of the G parameters increases from around 0.5, the laser pulse energy may monotonically decrease.

Accordingly, a preferable condition as the stable optical resonator may be 0.25<G1·G2<0.75. A more preferable condition may be 0.45<G1·G2<0.55.

Other operations may be substantially similar to those in the laser unit 101 according to the foregoing comparative example.

(2.3 Workings and Effects)

According to the laser unit 1 of the present embodiment, the spatial coherence in the H-axis direction may be low, as compared with the laser unit 101 according to the foregoing comparative example. Low spatial coherence in the H-axis direction may cause low contrast of an interference fringe generated by, for example, the fly-eye lens 72 of the annealing apparatus 12 illustrated in FIG. 25 to be described later. This makes it possible to improve performance of laser annealing etc. For example, application of laser beams in which the interference fringe contrast is decreased to amorphous silicon on a substrate makes it possible to improve uniformity of performance of a generated crystal.

[3. Second Embodiment]

Next, description is given of a laser unit according to a second embodiment of the present disclosure. Note that substantially same components as the components of the laser units according to the foregoing comparative example and the foregoing first embodiment are denoted by same reference numerals, and redundant description thereof is omitted.

(3.1 Configuration)

Figure 13:
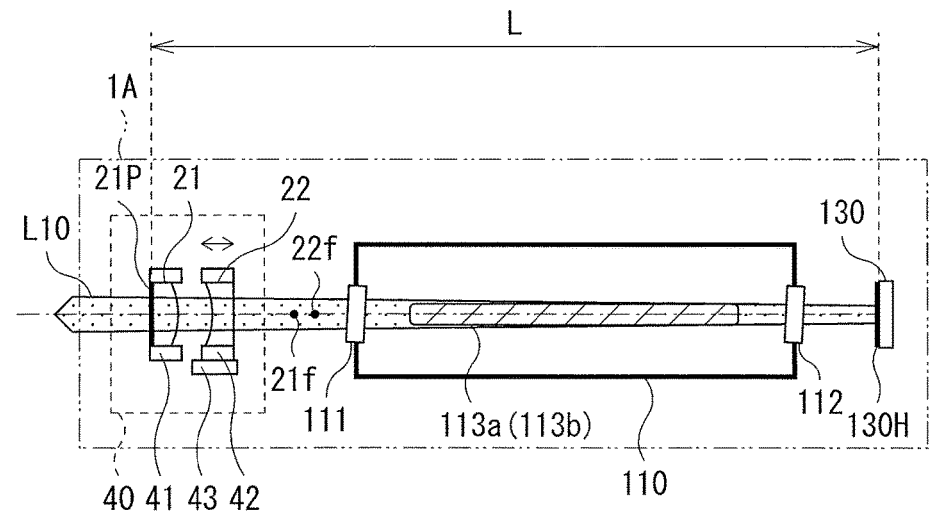
FIG. 13 schematically illustrates a cross-sectional configuration example in the H-axis direction of a laser unit according to a second embodiment.
Figure 14:
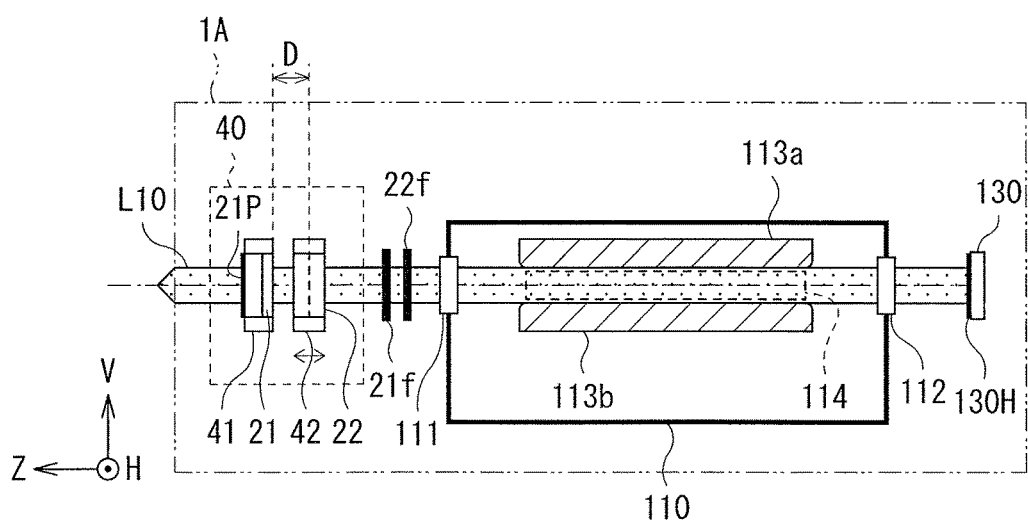
FIG. 14 schematically illustrates a cross-sectional configuration example in the V-axis direction of the laser unit according to the second embodiment.

FIG. 13 schematically illustrates a cross-sectional configuration example in the H-axis direction of a laser unit 1A according to the second embodiment of the present disclosure. FIG. 14 schematically illustrates a cross-sectional configuration example in the V-axis direction of the laser unit 1A according to the second embodiment of the present disclosure.

The laser unit 1A according to the present embodiment may include a spatial coherence adjuster 40 in place of the output coupling mirror 120 in the laser unit 101 according to the foregoing comparative example. The spatial coherence adjuster 40 may include a cylindrical piano-convex lens 21, a cylindrical piano-concave lens 22, and a uniaxial stage 43. The spatial coherence adjuster 40 may further include a holder 41 and a holder 42. The holder 41 may hold the cylindrical piano-convex lens 21, and the holder 42 may hold the cylindrical piano-concave lens 22.

In the laser unit 1A, the cylindrical piano-convex lens 21 and the cylindrical piano-concave lens 22 may correspond to the first optical member, and rear mirror 130 may correspond to the second optical member. Both of the cylindrical piano-convex lens 21 and the cylindrical piano-concave lens 22 may be opposed to the rear mirror 130 in the Z-axis direction with the discharge electrodes 113a and 113b interposed in between, and may configure an optical resonator that amplifies pulsed laser light generated between the discharge electrodes 113a and 113b and outputs amplified pulsed laser light.

The cylindrical piano-convex lens 21, the cylindrical piano-concave lens 22, and the rear mirror 130 may be so disposed as to allow the optical resonator to serve as a stable resonator in the H-axis direction.

The cylindrical piano-convex lens 21 may be so disposed as to allow a focal axis 21f to be substantially parallel to a V axis and be located substantially on an optical path axis of the optical resonator in the H-axis direction. A planar surface of the cylindrical piano-convex lens 21 may be coated with a PR film 21P. A cylindrical surface of the cylindrical piano-convex lens 21 may be coated with an AR film. The cylindrical piano-convex lens 21 may be so disposed as to allow the planar surface coated with the PR film 21P to be directed toward the output side of the pulsed laser light L10 and as to allow a cylindrical convex surface to be directed toward the chamber 110.

The cylindrical plano-concave lens 22 may be so disposed as to allow a focal axis 22*f* to be substantially parallel to the V axis and be located substantially on the optical path axis of the optical resonator in the H-axis direction. Both surfaces of the cylindrical plano-concave lens 22 may be coated with an AR film. The cylindrical plano-concave lens 22 may be so disposed as to allow a planar surface to be directed toward the chamber 110 and as to allow a cylindrical concave surface to be directed toward the output side of the pulsed laser light L10.

A focal length of the cylindrical piano-convex lens 21 may be longer than a focal length of the cylindrical plano-concave lens 22.

The uniaxial stage 43 may be so disposed as to allow the cylindrical plano-concave lens 22 to move substantially along the optical path axis of the optical resonator through the holder 42. The optical path axis of the optical resonator may be substantially parallel to the Z axis. The G parameter G1 of the spatial coherence adjuster 40 may be adjustable by the uniaxial stage 43.

Other configurations may be substantially similar to those of the laser units according to the foregoing comparative example and the foregoing first embodiment.

(3.2 Operation)

Figure 15:
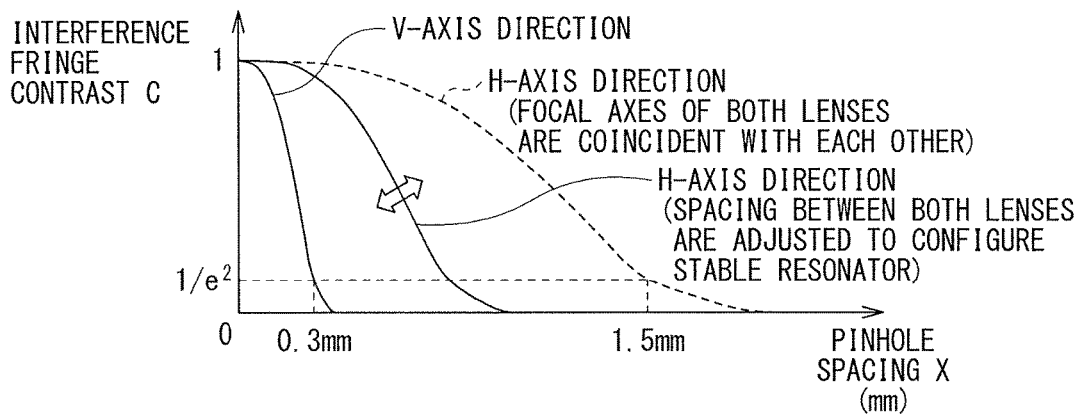
FIG. 15 schematically illustrates an example of results of measurement of spatial coherent lengths in the H-axis direction and the V-axis direction of laser light outputted from the laser unit according to the second embodiment.
Figure 16:
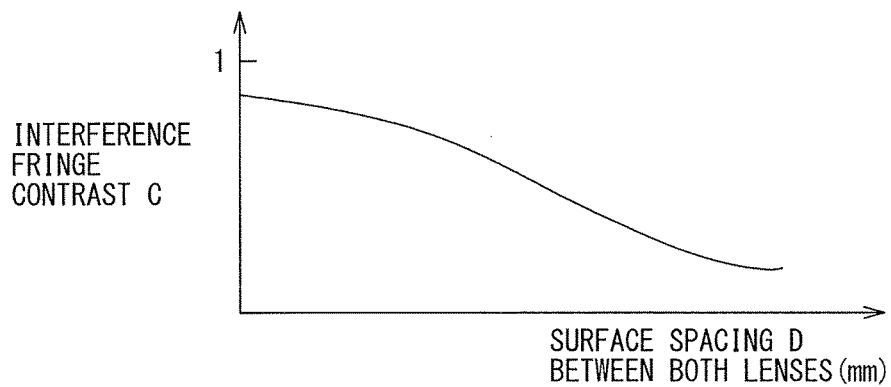
FIG. 16 schematically illustrates an example of a relationship between a surface spacing between both a cylindrical plano-convex lens and a cylindrical plano-concave lens in a spatial coherence adjuster and interference fringe contrast.

FIG. 15 schematically illustrates an example of results of measurement of spatial coherent lengths Xc in the H-axis direction and the V-axis direction of the pulsed laser light L10 outputted from the laser unit 1A. FIG. 16 schematically illustrates an example of a relationship between a surface spacing D between both lenses, i.e., the cylindrical piano-convex lens 21 and the cylindrical plano-concave lens 22 in the spatial coherence adjuster 40 and the interference fringe contrast C.

The G parameters G1 and G2 of the optical resonator in the present embodiment may be as follows.

Since R1=2F1 and R2=2F2 are established, the G parameters G1 and G2 may be represented as focal lengths by the following expressions:

$$G1=1-L/(2F1), \text{ and}$$

$$G2=1-L/(2F2)$$

where F1 is a focal length on front side and F2 is a focal length on rear side.

It is to be noted that in the present embodiment, the focal length on the front side may be a combined focal length of the cylindrical piano-convex lens 21 and the cylindrical plano-concave lens 22. The focal length on the rear side may be a focal length of the rear mirror 130.

Since the rear mirror 130 is a surface mirror, F2=∞ is established, and G2=1 is thereby derived. Accordingly, a range of the stable resonator is 0<G1<1 that is derived from the above-described expression (1).

In a state in which the focal axis 21*f* of the cylindrical piano-convex lens 21 and the focal axis 22*f* of the cylindrical plano-concave lens 22 are coincident with each other, G1=1 is established. The cylindrical plano-concave lens 22 may be moved in an optical path axis direction so as to increase the surface spacing D between both lenses from this state, which may vary the combined focal length F1 of both lenses.

The optical resonator in the present embodiment may be a stable resonator in the H-axis direction by adjusting the position of the cylindrical plano-concave lens 22 in a range of 0<G1<1. In particular, as illustrated in FIGS. 12, 15, and 16, when the surface spacing D between both lenses is increased so as to decrease the G parameter G1 in a range of 0.5<G1<1, the interference fringe contrast C in the H-axis direction may decrease.

Other operations may be substantially similar to those in the laser units according to the foregoing comparative example and the foregoing first embodiment.

(3.3 Workings and Effects)

According to the laser unit 1A of the present embodiment, adjusting the surface spacing D between both lenses in the spatial coherence adjuster 40 makes it possible to adjust the interference fringe contrast C in the H-axis direction in the pulsed laser light L1 to be outputted. This makes it possible to adjust the interference fringe contrast C corresponding to an array pitch P in the H-axis direction in the fly-eye lens 72 of the annealing apparatus 12 illustrated in FIG. 25 to be described later, which makes it possible to adjust performance of laser annealing etc.

In a case where the optical resonator is configured of the cylindrical mirrors as with the laser unit 1 according to the foregoing first embodiment, processing of a curvature radius of about 2 m or more may be difficult. In this case, a combination of the cylindrical piano-convex lens 21 having a short curvature radius and the cylindrical plano-concave lens 22 having a short curvature radius makes it easier to increase the combined focal length.

Other workings and effects may be substantially similar to those of the laser unit according to the foregoing first embodiment.

(3.4 Modification Examples)

The present embodiment involves a case where the surface spacing D between both lenses is adjustable in the spatial coherence adjuster 40; however, the present embodiment is not limited thereto. In a case where the value of the G parameter G1 is determined by design in advance, the surface spacing D may be fixed, and the uniaxial stage 43 may be removed from the configuration.

Figure 17:
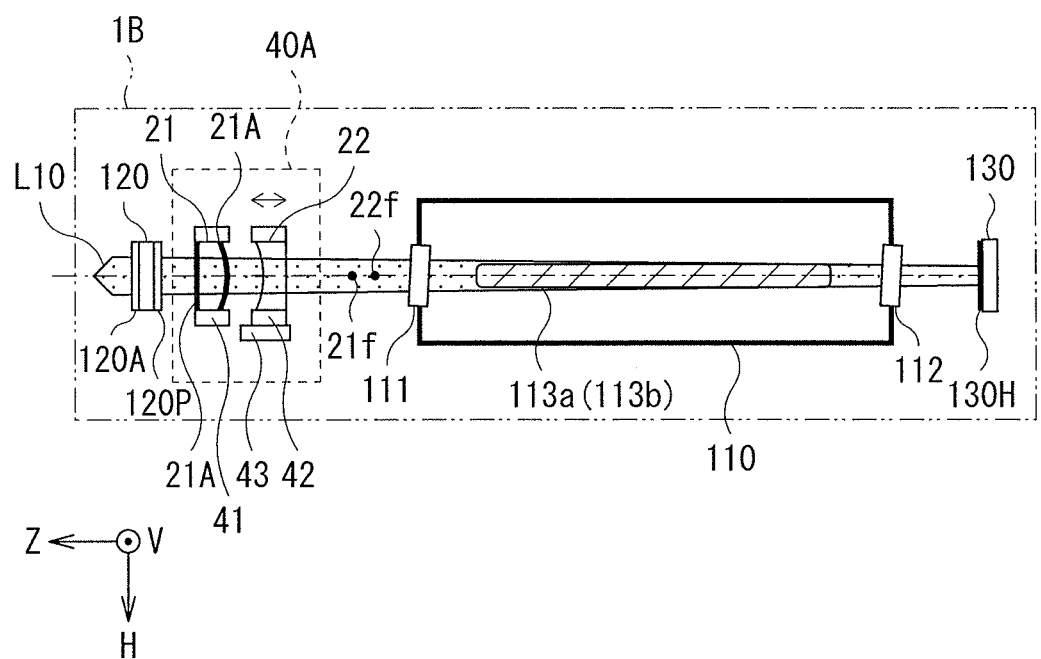
FIG. 17 schematically illustrates a cross-sectional configuration example in the H-axis direction of a laser unit according to a modification example of the second embodiment.

Moreover, the present embodiment involves a case where the planar surface of the cylindrical piano-convex lens 21 is coated with the PR film 21P to configure a partial reflection mirror; however, the present embodiment is not limited thereto. For example, a configuration of a laser unit 1B according to a modification example as illustrated in FIG. 17 may be adopted.

The laser unit 1B according to the modification example may include a spatial coherence adjuster 40A in place of the spatial coherence adjuster 40. The spatial coherence adjuster 40A may differ from the spatial coherence adjuster 40 in that only a film configuration of the cylindrical piano-convex lens 21 is different. More specifically, in the spatial coherence adjuster 40A, both surfaces of the cylindrical piano-convex lens 21 may be coated with an AR film 21A. The output coupling mirror 120 that is substantially similar to that in the laser unit 101 according to the foregoing comparative example may be disposed on front side of the cylindrical piano-convex lens 21 having both surfaces coated with the AR film 21A.

Other configurations, workings, and effects may be substantially similar to those of the laser unit 1A illustrated in FIGS. 13 and 14.

[4. Third Embodiment]

Next, description is given of a laser system according to a third embodiment of the present disclosure. Note that substantially same components as the components of the laser units according to the foregoing comparative example, the foregoing first embodiment, and the foregoing second embodiment are denoted by same reference numerals, and redundant description thereof is omitted.

(4.1 Configuration)

Figure 18:
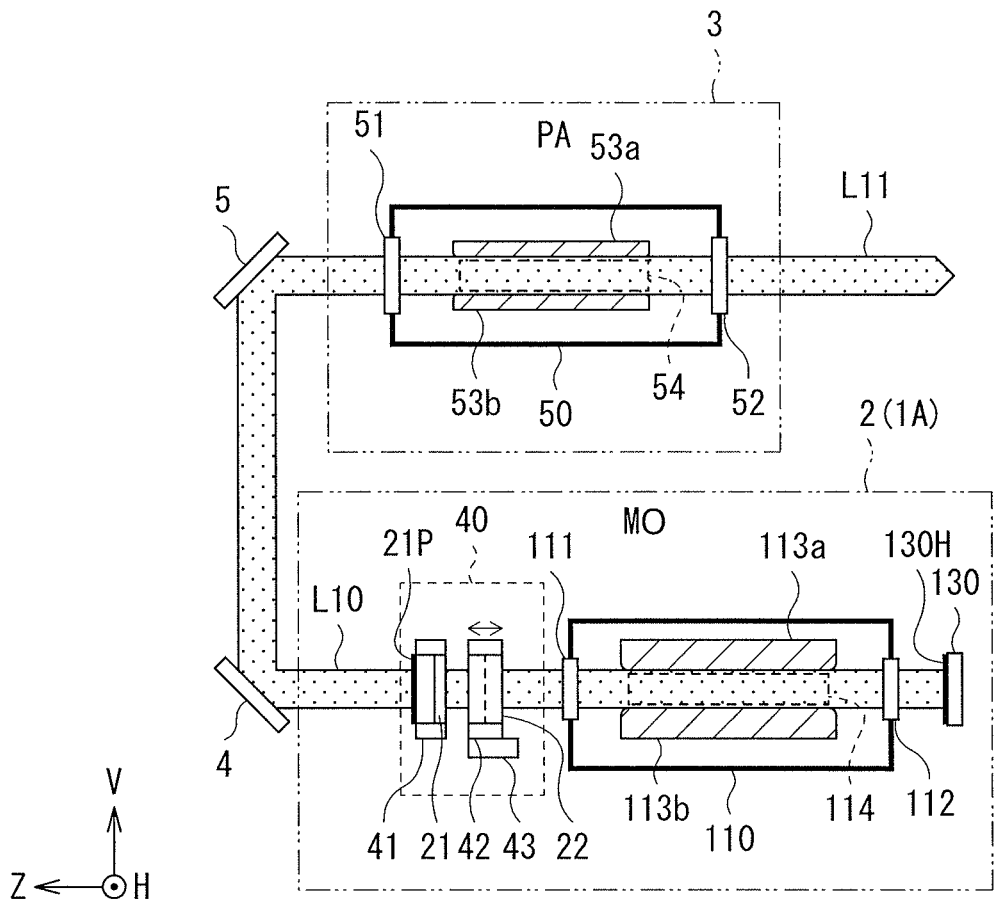
FIG. 18 schematically illustrates a cross-sectional configuration example in the V-axis direction of a laser system according to a third embodiment.
Figure 19:
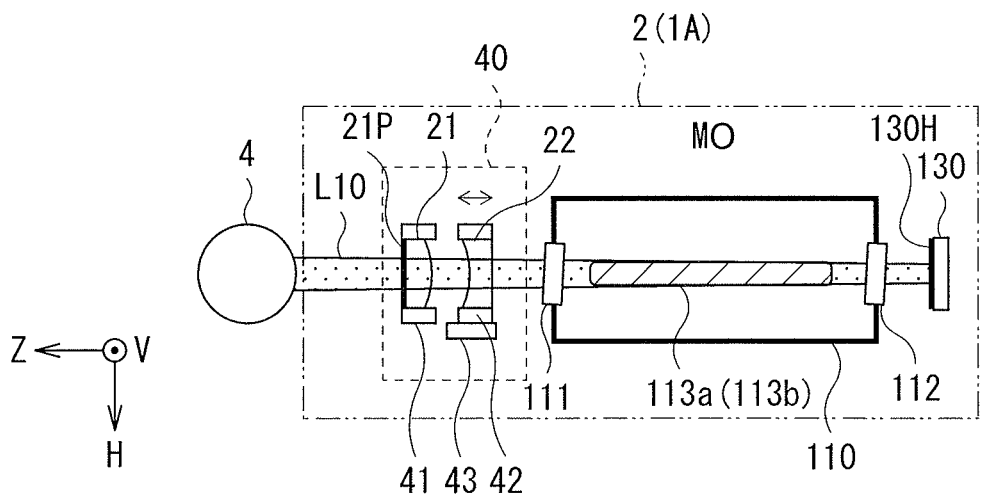
FIG. 19 schematically illustrates a cross-sectional configuration example in the H-axis direction of the laser system according to the third embodiment.

FIG. 18 schematically illustrates a cross-sectional configuration example in the V-axis direction of the laser system according to the third embodiment of the present disclosure. FIG. 19 schematically illustrates a cross-sectional configuration example in the H-axis direction of the laser system according to the third embodiment of the present disclosure.

The laser system according to the present embodiment may include a master oscillator (MO) 2, a high reflection mirror 4, a high reflection mirror 5, and a power amplifier (PA) 3. The MO 2 may have a configuration substantially similar to the configuration of the laser unit 1A according to the foregoing second embodiment.

Each of a surface of the high reflection mirror 4 and a surface of the high reflection mirror 5 may be coated with a high reflection film. The high reflection mirror 4 and the high reflection mirror 5 may be so disposed as to allow the pulsed laser light L10 outputted from the MO 2 to enter the PA 3.

The PA 3 may include a chamber 50. The chamber 50 may include a first window 51 and a second window 52. The pulsed laser light L10 may pass through the first window 51 into the chamber 50, and amplified pulsed laser light L11 may pass through the second window 52 to outside. The chamber 50 may further include a pair of discharge electrodes 53a and 53b. The chamber 50 may contain a laser gas substantially similar to the laser gas contained in the chamber 110 of the MO 2.

Other configurations may be substantially similar to those of the laser unit 1A according to the foregoing second embodiment.

(4.2 Operation)

The MO 2 may configure a stable resonator in the H-axis direction, which may cause an increase in the number of spatial transverse modes in the H-axis direction. As a result, spatial coherence in the H-axis direction of the pulsed laser light L10 outputted from the MO 2 may decrease, as compared with an optical resonator configured of surface mirrors. The pulsed laser light L10 may be amplified by passing through a discharge region 54 of the chamber 50 of the PA 3 via the high reflection mirror 4 and the high reflection mirror 5. The spatial coherence in the H-axis direction of the pulsed laser light L11 amplified by the PA 3 may be in a state in which the spatial coherence of the MO 2 is substantially maintained.

Other operations may be substantially similar to those of the laser unit 1A according to the foregoing second embodiment.

(4.3 Workings and Effects)

According to the laser system of the present embodiment, the pulsed laser light L10 outputted from the MO 2 is amplified by the PA 3, which makes it possible to increase pulse energy by about twice or more times. In addition, the spatial coherence in the H-axis direction may maintain a state equivalent to the state of the MO 2.

Other workings and effects may be substantially similar to those of the laser unit 1A according to the foregoing second embodiment.

[5. Fourth Embodiment]

Next, description is given of a control system according to a fourth embodiment of the present disclosure. Note that substantially same components as the components of the laser units according to the foregoing comparative example, the foregoing first embodiment, and the foregoing second embodiment, and the components of the laser system according to the foregoing third embodiment are denoted by same reference numerals, and redundant description thereof is omitted.

(5.1 Configuration)

Figure 20:
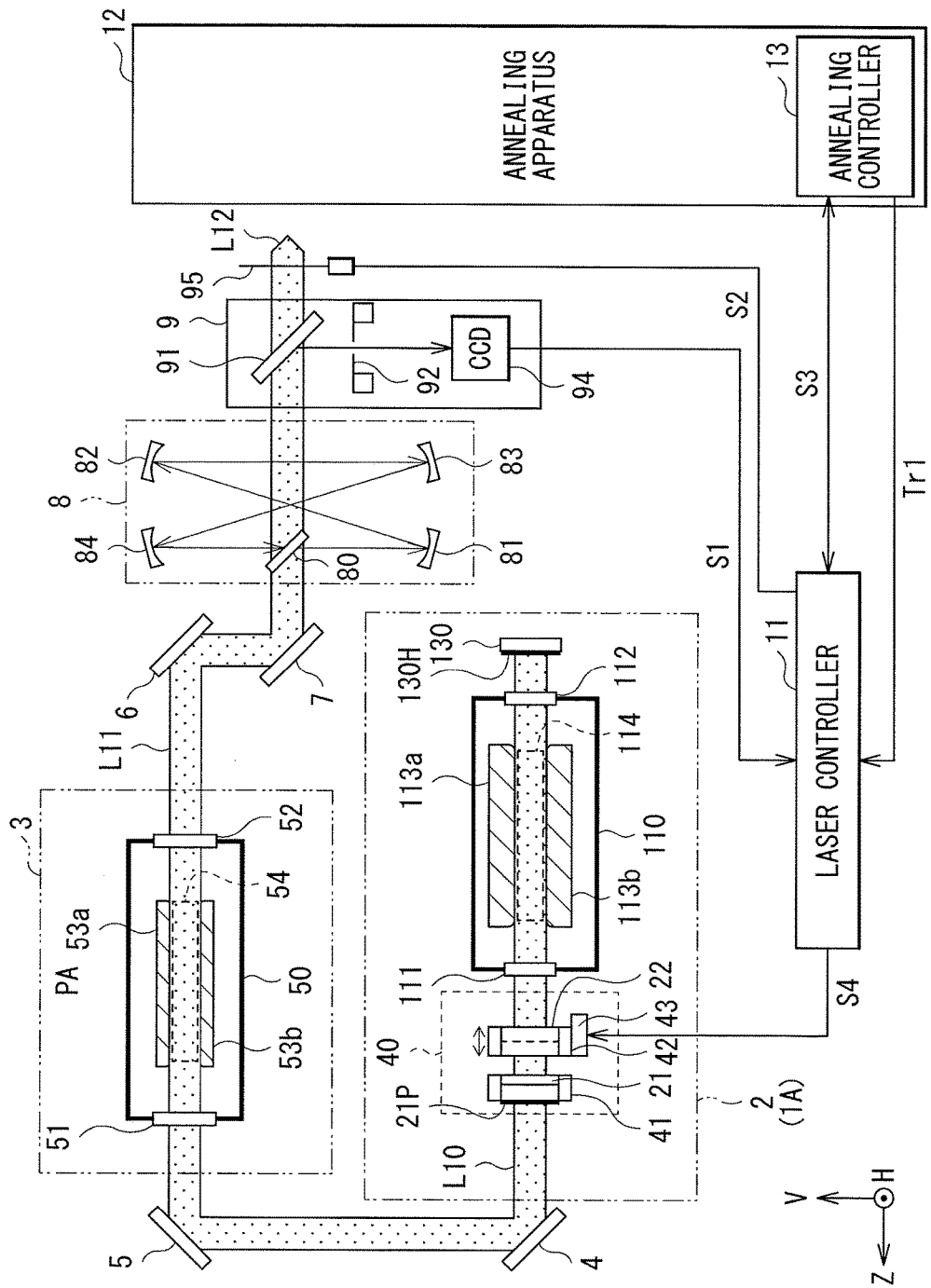
FIG. 20 schematically illustrates a cross-sectional configuration example in the V-axis direction of a control system according to a fourth embodiment.

FIG. 20 substantially illustrates a cross-sectional configuration example in the V-axis direction of the control system according to the fourth embodiment of the present disclosure.

The control system according to the present embodiment may further include a laser controller 11 in the laser system according to the foregoing third embodiment. Moreover, the control system may further include a high reflection mirror 6 and a high reflection mirror 7, an optical pulse stretcher (OPS) 8, a coherence monitor 9, and an exit port shutter 95 on output side of the PA 3. Further, the control system may be so disposed as to output pulsed laser light L12 used for annealing to the annealing apparatus 12 illustrated in FIG. 25 to be described later. The annealing apparatus 12 may include an annealing controller 13.

The high reflection mirror 6 and the high reflection mirror 7 may be so disposed as to allow the pulsed laser light L11 outputted from the PA 3 to enter the OPS 8. Each of a surface of the high reflection mirror 6 and a surface of the high reflection mirror 7 may be coated with an HR film.

The OPS 8 may include a beam splitter 80 and concave mirrors 81, 82, 83, and 84. The beam splitter 80 may partially reflect about 60% of the received pulsed laser light L11 and may allow about 40% of the pulsed laser light L11 to pass therethrough.

Each of the concave mirrors 81, 82, 83, and 84 may be a spherical mirror having a substantially equal curvature radius R. A surface of each of the concave mirrors 81, 82, 83, and 84 may be coated with an HR film. The concave mirrors 81, 82, 83, and 84 may be disposed in an optical path in this order. The concave mirrors 81, 82, 83, and 84 may be disposed so that an optical path length between respective mutually-adjacent two of the concave mirrors 81, 82, 83, and 84 is substantially equal to the curvature radius R. The concave mirrors 81, 82, 83, and 84 may transfer a first image of a beam of the pulsed laser light L11 having entered the beam splitter 80 onto the beam splitter 80 again as a second image.

The coherence monitor 9 may include a beam splitter 91, a double pinhole 92, and a CCD camera 94. The beam splitter 91 may be disposed in an optical path of the pulsed laser light L11 outputted from the OPS 8. The double pinhole 92 may be so disposed as to be irradiated with the pulsed laser light L11 reflected by the beam splitter 91.

Figure 26:
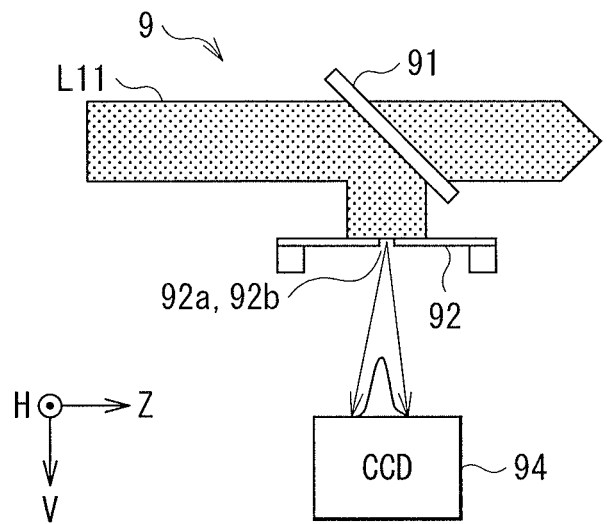
FIG. 26 schematically illustrates a cross-sectional configuration example in the V-axis direction of a specific example of a coherence monitor.
Figure 27:
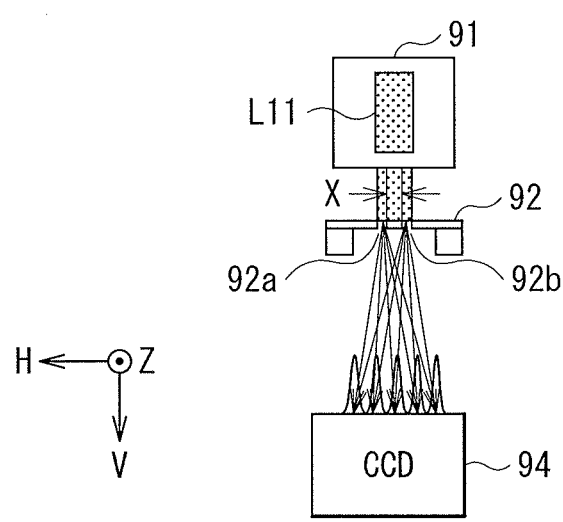
FIG. 27 schematically illustrates a cross-sectional configuration example in the H-axis direction of the specific example of the coherence monitor.

The CCD camera 94 may be so disposed as to allow an interference fringe generated by light having passed through the double pinhole 92 to be measured. The double pinhole 92 may include two pinholes 92a and 92b that penetrate through a substrate, as illustrated in FIGS. 26 and 27 to be described later. The two pinholes 92a and 92b may be provided with a predetermined pinhole spacing X in the H-axis direction of the pulsed laser light L11. The predetermined pinhole spacing X may satisfy a relationship of X=P/M, where P is an array pitch in the H-axis direction in the fly-eye lens 72 in the annealing apparatus 12, and M is an expansion magnification in the H-axis direction of the beam expander 70.

Other configurations may be substantially similar to those of the laser system according to the foregoing third embodiment.

(5.2 Operation)

Figure 21:
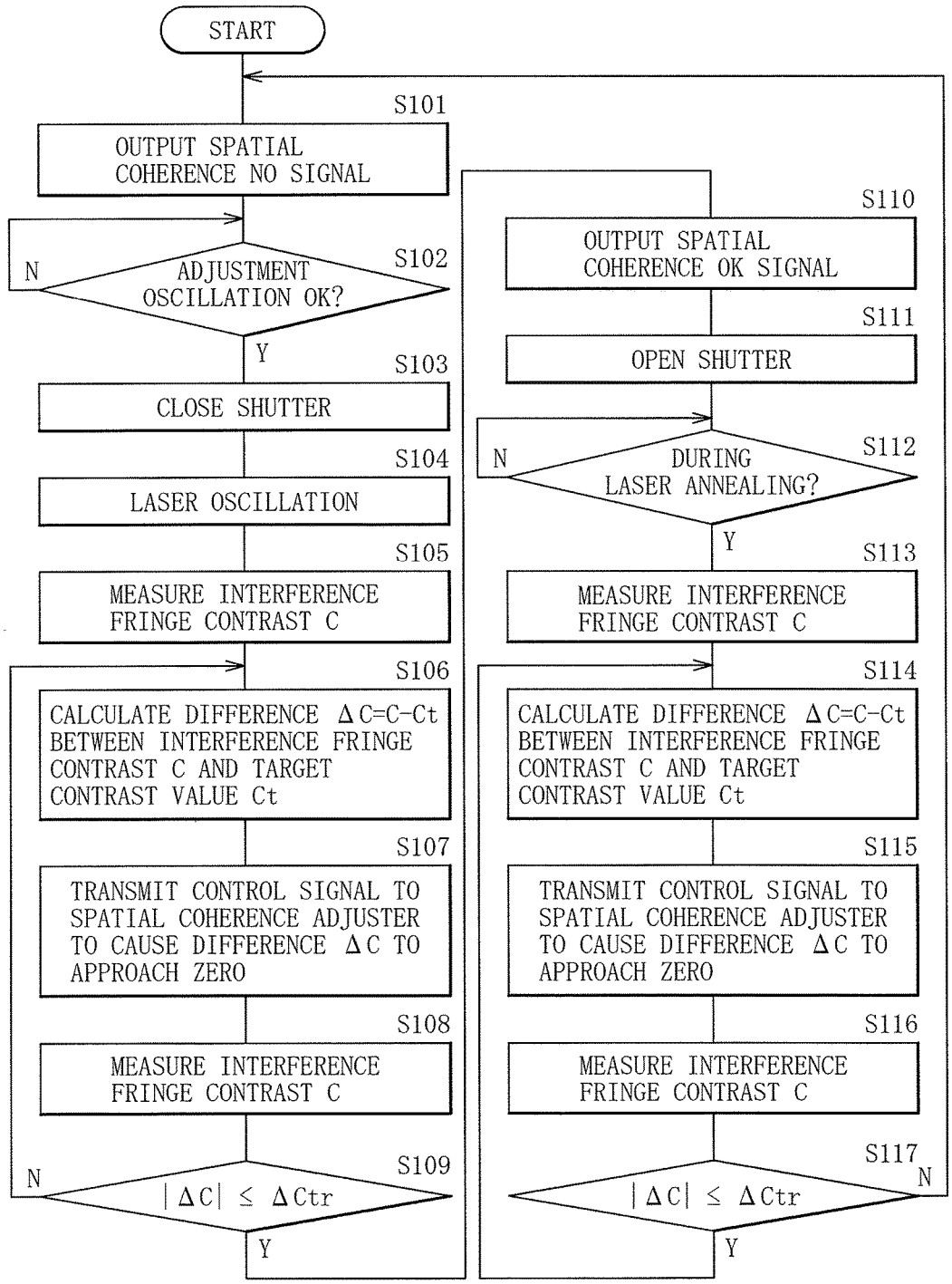
FIG. 21 is a flowchart illustrating an example of a flow of control by a laser controller in the control system according to the fourth embodiment.

FIG. 21 illustrates an example of a flow of control by the laser controller 11 in the control system according to the fourth embodiment of the present disclosure.

The laser controller 11 may first output a spatial coherence No signal to the annealing controller 13 as a control signal S3 (step S101). Next, the laser controller 11 may determine whether an adjustment oscillation OK signal has been received as the control signal S3 from the annealing controller 13 (step S102). In a case where the laser controller 11 determines that adjustment oscillation OK signal has not been received from the annealing controller 13 (step S102; N), a process in the step S102 may be repeated. In a case where the laser controller 11 determines that the adjustment oscillation OK signal has been received from the annealing controller 13 (step S102; Y), the laser controller 11 may output, to the exit port shutter 95, a signal that provides an instruction to close the exit port shutter 95 as a shutter control signal S2 (step S103).

Next, the laser controller 11 may perform laser oscillation at a predetermined repetition frequency in synchronization with the MO 2 and the PA 3 (step S104). This may cause the PA 3 to output amplified pulsed laser light L11. The amplified pulsed laser light L11 may enter the OPS 8 via the high reflection mirror 6 and the high reflection mirror 7.

A part of the pulsed laser light L11 having entered the OPS 8 may pass through the beam splitter 80 to be outputted from the OPS 8. The other part of the pulsed laser light L11 having entered the OPS 8 may be reflected by the beam splitter 80 to enter the beam splitter 80 again via the concave mirrors 81, 82, 83, and 84. At this occasion, a first image of a beam of the pulsed laser light L11 having entered the beam splitter 80 may be transferred as a second image onto the beam splitter 80 again via the concave mirrors 81, 82, 83, and 84. Repetition of such a process may cause the pulsed laser light L11 having entered the OPS 8 to be subjected to pulse stretching.

A part of the pulsed laser light L11 outputted from the OPS 8 may be reflected by the beam splitter 91 of the coherence monitor 9, and the other part of the pulsed laser light L11 may pass through the beam splitter 91 to enter the exit port shutter 95. Light reflected by the beam splitter 91 may pass through the double pinhole 92 to form an interference fringe on an imaging plane of the CCD camera 94. The CCD camera 94 may measure a light intensity distribution of the interference fringe, and may output, to the laser controller 11, a measurement signal S1 that indicates a result of the measurement. Next, the laser controller 11 may measure the interference fringe contrast C on the basis of the result of the measurement by the coherence monitor 9 (step S105).

Next, the laser controller 11 may calculate a difference $\Delta C = C - Ct$ between the interference fringe contrast C and a target contrast value Ct (step S106). Subsequently, the laser controller 11 may transmit a control signal S4 to the uniaxial stage 43 of the spatial coherence adjuster 40 to cause the difference $\Delta C$ between the interference fringe contrast C and the target contrast value Ct to approach zero (step S107).

Subsequently, the laser controller 11 may measure the interference fringe contrast C on the basis of the result of measurement by the coherence monitor 9 (step S108). Next, the laser controller 11 may determine whether an absolute value $|\Delta C|$ of the difference $\Delta C$ between the interference fringe contrast C and the target contrast value Ct is within an allowable range being $\Delta Ctr$ or less (step S109). In a case where the laser controller 11 determines that the absolute value $|\Delta C|$ is not within the allowable range being $\Delta Ctr$ or less (step S109; N), the laser controller 11 may return to a process in the step S106 and perform the process in the step S106. In a case where the laser controller 11 determines that the absolute value $|\Delta C|$ is within the allowable range being $\Delta Ctr$ or less (step S109; Y), the laser controller 11 may control the MO 2 and the PA 3 to stop laser oscillation.

Thereafter, the laser controller 11 may output the spatial coherence OK signal as the control signal S3 to the annealing controller 13 (step S110). Next, the laser controller 11 may output, to the exit port shutter 95, a signal that provides an instruction to open the exit port shutter 95 as the shutter control signal S2 (step S111).

Next, the laser controller 11 may determine whether the annealing apparatus 12 is performing laser annealing (step S112). In a case where the laser controller 11 determines that the annealing apparatus 12 is not performing laser annealing (step S112; N), a process in the step S112 may be repeated.

In a case where the laser controller 11 determines that the annealing apparatus 12 is performing laser annealing (step S112; Y), the laser controller 11 may perform processes in steps S113 to S117 that are substantially similar to processes in the steps S105 to S109 mentioned above. At this occasion, in the step S117, in a case where the laser controller 11 determines that the absolute value $|\Delta C|$ of the difference $\Delta C$ between the interference fringe contrast C and the target contrast value Ct is not within the allowable range being $\Delta Ctr$ or less (step S117; N), the laser controller 11 may return to a process in the step S101, and perform the process in the step S101. Moreover, in the step S117, in a case where the laser controller 11 determines that the absolute value $|\Delta C|$ of the difference $\Delta C$ from the target contrast value Ct is within the allowable range being $\Delta Ctr$ or less (step S117; Y), the laser controller 11 may return to the process in the step S114 and perform the process in the step S114. In contrast, in the case where the laser controller 11 determines that the absolute value $|\Delta C|$ of the difference $\Delta C$ between the interference fringe contrast C and the target contrast value Ct is within the allowable range being $\Delta Ctr$ or less (step S117; Y), the laser controller 11 may not return to the process in the step S114 and end the process.

Other operations may be substantially similar to those of the laser system according to the foregoing third embodiment.

(5.3 Workings and Effects)

According to the control system of the present embodiment, the spatial coherence adjuster 40 may be subjected to feedback control on the basis of the interference fringe contrast C measured by the coherence monitor 9. This makes it possible to stabilize spatial coherence of the pulsed laser light L12 entering the annealing apparatus 12.

Other workings and effects may be substantially similar to those of the laser system according to the foregoing third embodiment.

[6. Variations of Components and Specific Examples of Components]

Next, description is given of variations of some components of the foregoing respective embodiments and specific examples of some components of the foregoing respective embodiments. Note that substantially same components as the components of the units and the apparatuses according to the foregoing comparative example and the foregoing respective embodiments are denoted by same reference numerals, and redundant description thereof is omitted.

(6.1 Variations of Stable Resonator)
(First Variation of Stable Resonator)

Figure 22:
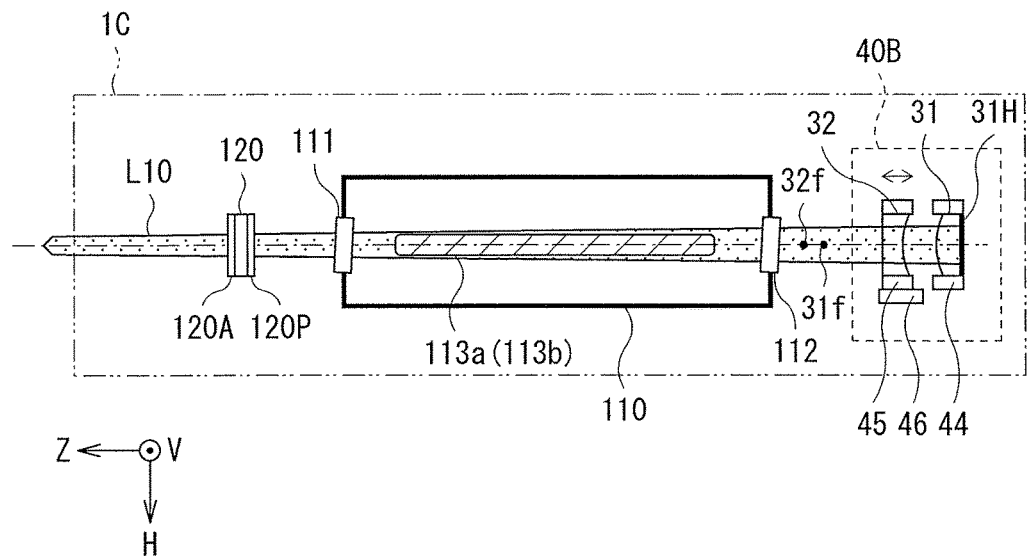
FIG. 22 schematically illustrates a cross-sectional configuration example in the H-axis direction of a first variation of a stable resonator.

FIG. 22 schematically illustrates a cross-sectional configuration example in the H-axis direction of a first variation of the stable resonator. A laser unit 1C illustrated in FIG. 22 may include a spatial coherence adjuster 40B in place of the rear mirror 130 in the laser unit 101 according to the foregoing comparative example. The spatial coherence adjuster 40B may include a cylindrical plano-convex lens 31, a cylindrical plano-concave lens 32, and a uniaxial stage

46. Moreover, the spatial coherence adjuster 40B may include a holder 44 and a holder 45. The holder 44 may hold the cylindrical plano-convex lens 31, and the holder 45 may hold the cylindrical plano-concave lens 32.

In the laser unit 1C, the output coupling mirror 120 may correspond to the first optical member, and the cylindrical piano-convex lens 31 and the cylindrical plano-concave lens 32 may correspond to the second optical member. Both of the cylindrical piano-convex lens 31 and the cylindrical plano-concave lens 32 may be opposed to the output coupling mirror 120 in the Z-axis direction with the discharge electrodes 113a and 113b interposed in between, and may configure an optical resonator that amplifies pulsed laser light generated between the discharge electrodes 113a and 113b and outputs amplified pulsed laser light.

The output coupling mirror 120, the cylindrical piano-convex lens 31, and the cylindrical plano-concave lens 32 may be so disposed as to allow the optical resonator to serve as a stable resonator in the H-axis direction.

The cylindrical piano-convex lens 31 may be so disposed as to allow a focal axis 31f to be substantially parallel to the V axis and be located substantially on an optical path axis of the optical resonator in the H-axis direction. A planar surface of the cylindrical piano-convex lens 31 may be coated with an HR film 31H. A cylindrical convex surface of the cylindrical piano-convex lens 31 may be coated with an AR film. The cylindrical piano-convex lens 31 may be so disposed as to allow the cylindrical convex surface to be directed toward the chamber 110.

The cylindrical plano-concave lens 32 may be so disposed as to allow a focal axis 32f to be substantially parallel to the V axis and be located substantially on the optical path axis of the optical resonator in the H-axis direction. Both surfaces of the cylindrical plano-concave lens 32 may be coated with an AR film. The cylindrical plano-concave lens 32 may be so disposed as to allow a planar surface to be directed toward the chamber 110.

The uniaxial stage 46 may be so disposed as to allow the cylindrical plano-concave lens 32 to move substantially along the optical path axis of the optical resonator through the holder 45. The optical path axis of the optical resonator may be substantially parallel to the Z axis. The G parameter G2 of the spatial coherence adjuster 40B may be adjustable by the uniaxial stage 46.

The G parameters G1 and G2 of the optical resonator in the laser unit 1C may be as follows.

Since R1=2F1 and R2=2F2 are established, the G parameters G1 and G2 may be represented as focal lengths by the following expressions:

$$G1=1-L/(2F1), \text{ and}$$

$$G2=1-L/(2F2)$$

where F1 is a focal length on front side and F2 is a focal length on rear side.

It is to be noted that in the laser unit 1C, the focal length on the front side may be a focal length of the output coupling mirror 120. The focal length on the rear side may be a combined focal length of the cylindrical plano-convex lens 31 and the cylindrical plano-concave lens 32.

Since the output coupling mirror 120 is a surface mirror, F1=∞ is established, and G1=1 is thereby derived. Accordingly, a range of the stable resonator in the laser unit 1C is 0<G2<1 that is derived from the above-described expression (1).

According to the laser unit 1C, adjusting the surface spacing D between both lenses in the spatial coherence adjuster 40B may vary the number of spatial transverse modes, which may adjust spatial coherence.

Other configurations, operations, workings, and effects may be substantially similar to those of the laser units according to the foregoing comparative example and the foregoing first and second embodiments.

(Second Variation of Stable Resonator)

Figure 23:
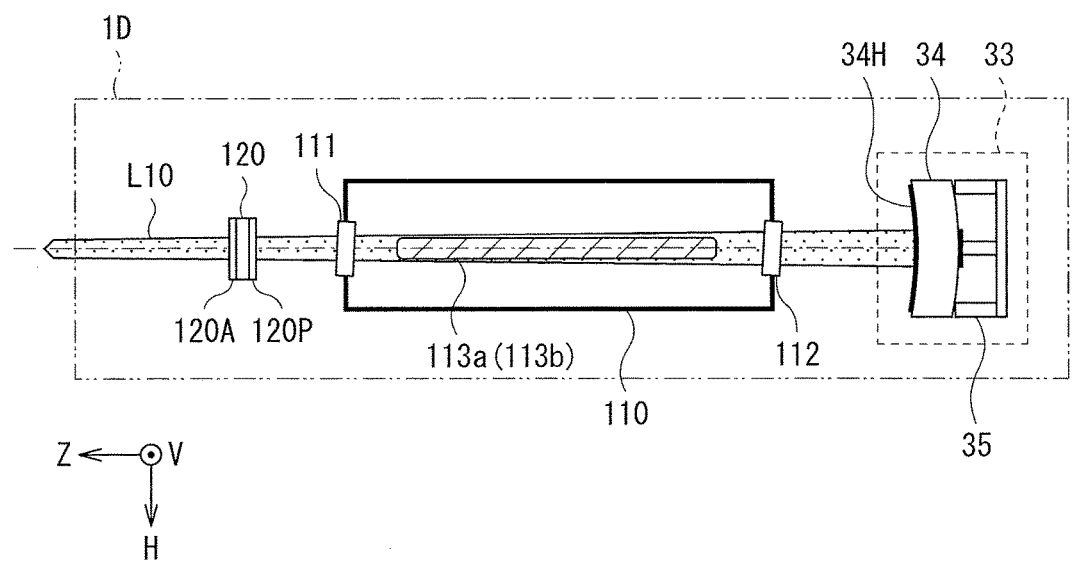
FIG. 23 schematically illustrates a cross-sectional configuration example in the H-axis direction of a second variation of the stable resonator.

FIG. 23 schematically illustrates a cross-sectional configuration example in the H-axis direction of a second variation of the stable resonator. A laser unit 1D illustrated in FIG. 23 may include a deformable mirror 33 serving as a spatial coherence adjuster in place of the rear mirror 130 in the laser unit 101 according to the foregoing comparative example. The deformable mirror 33 may include a rear mirror 34 and an actuator 35. The rear mirror 34 may include a thin planar substrate having a surface coated with an HR film 34H. The actuator 35 may be a one-dimensional actuator that varies a curvature radius R2 in the H-axis direction of the rear mirror 34.

(Third Variation of Stable Resonator)

Figure 24:
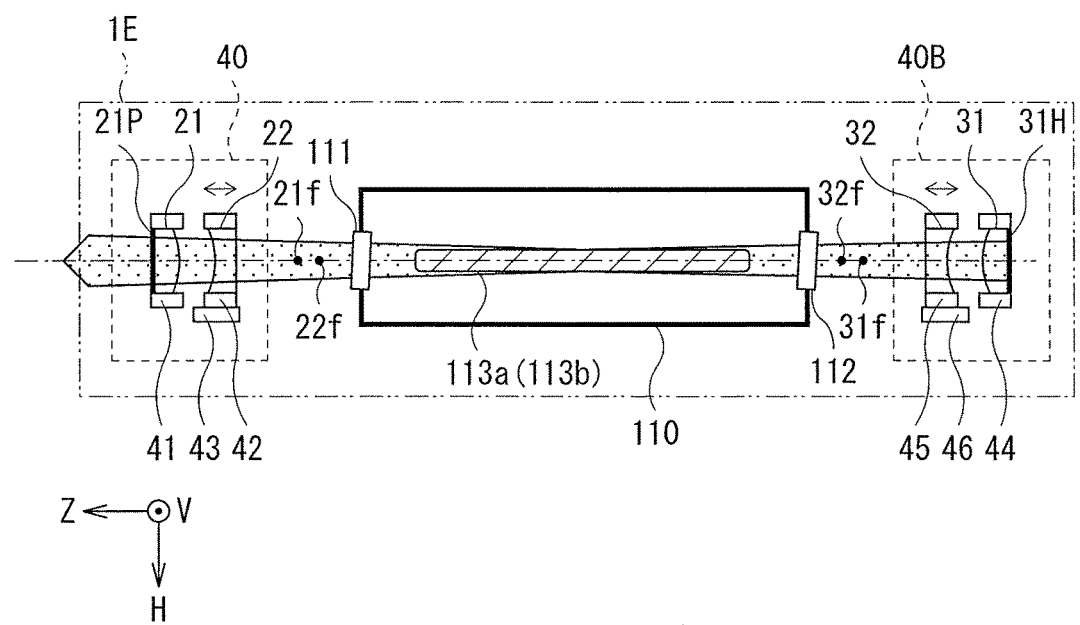
FIG. 24 schematically illustrates a cross-sectional configuration example in the H-axis direction of a third variation of the stable resonator.

FIG. 24 schematically illustrates a cross-sectional configuration example in the H-axis direction of a third variation of the stable resonator. A laser unit 1E illustrated in FIG. 24 may include the spatial coherence adjuster 40 in place of the output coupling mirror 120 in the laser unit 101 according to the foregoing comparative example, and may include the spatial coherence adjuster 40B in place of the rear mirror according to the foregoing comparative example.

According to the laser unit 1E, the spatial coherence adjusters are provided on the front side and the rear side of the optical resonator, which makes it possible to perform adjustment to further decrease the spatial coherence, as compared with a case where the spatial coherence adjuster is provided only one of the front side and the rear side.

(6.2 Specific Example of Annealing Apparatus)

Figure 25:
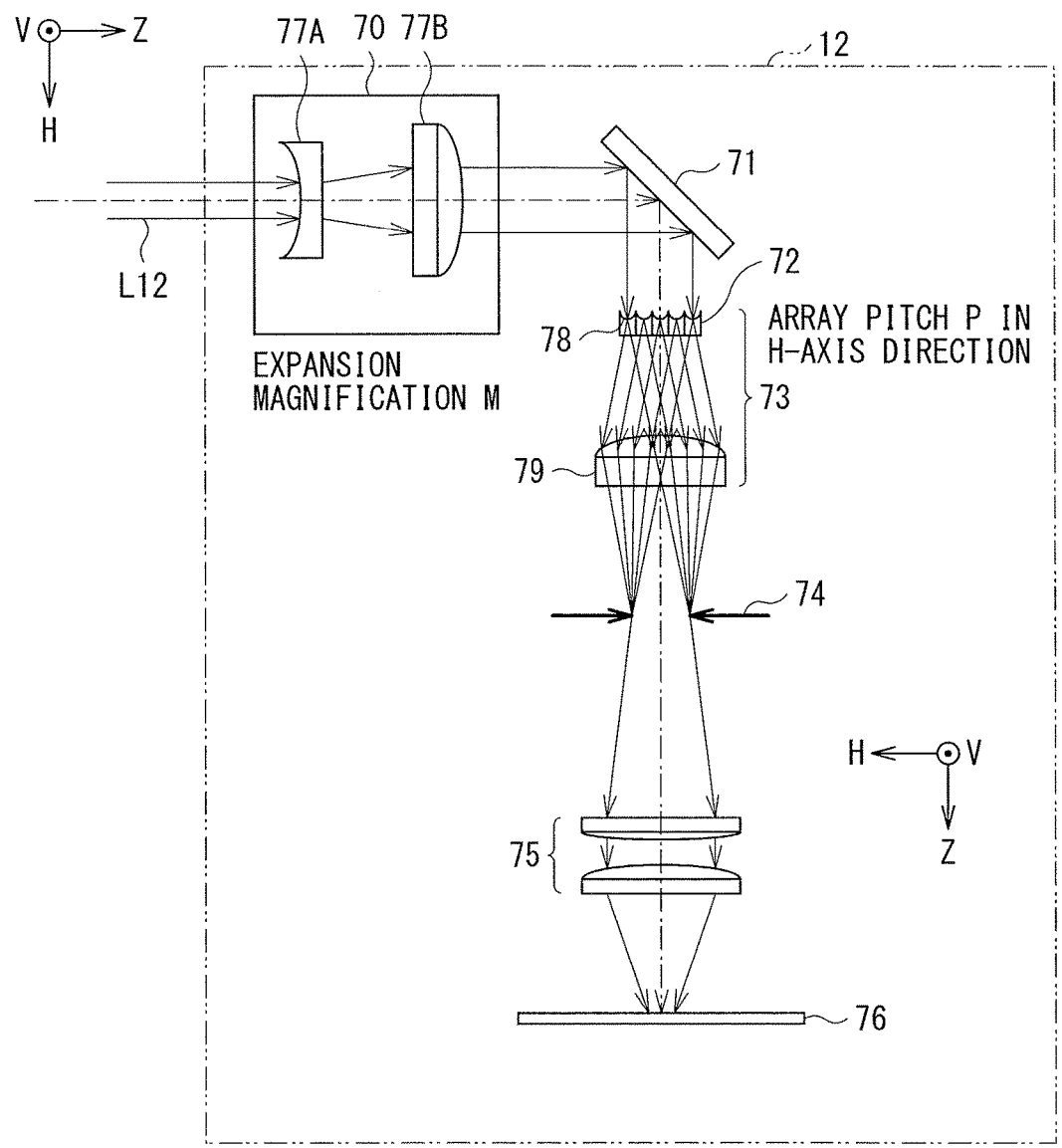
FIG. 25 schematically illustrates a specific example of an annealing apparatus.

FIG. 25 schematically illustrates a specific example of the annealing apparatus 12.

The annealing apparatus 12 may include the beam expander 70, a high reflection mirror 71, the illumination optical system 73, a mask 74, a transfer optical system 75, and an irradiation object 76.

The beam expander 70 may include a concave lens 77A and a convex lens 77B, and may expand the received pulsed laser light L12 at least in the H-axis direction by an expansion magnification M. The high reflection mirror 71 may reflect the pulsed laser light L12 expanded by the expansion magnification M toward the illumination optical system 73.

The illumination optical system 73 may include a fly-eye lens 72 and a capacitor optical system 79. The fly-eye lens 72 may include a plurality of lenses 78. The lenses 78 may be arranged with an array pitch P in the H-axis direction.

The mask 74 may be irradiated with the pulsed laser light L12 by the illumination optical system 73. An image of the mask 74 may be transferred to a surface of the irradiation object 76 by the transfer optical system 75.

For example, the laser system according to the foregoing fourth embodiment may output, toward the annealing apparatus 12, the pulsed laser light L12 that involves an spatial coherence length Xc of P/M or less in the H-axis direction.

(6.3 Specific Example of Coherence Monitor)

FIGS. 26 and 27 each illustrate a specific example of the coherence monitor 9 illustrated in FIG. 20. FIG. 26 schematically illustrates a cross-sectional configuration example in the V-axis direction of the specific example of the coherence monitor 9. FIG. 27 schematically illustrates a cross-sectional configuration example in the H-axis direction of the specific example of the coherence monitor 9.

The coherence monitor 9 having a configuration illustrated in FIGS. 26 and 27 may be used to estimate, for example, the interference fringe contrast C on the mask 74 and the interference fringe contrast C on the irradiation object 76 in the annealing apparatus 12 illustrated in FIG. 25.

The double pinhole 92 may be so disposed as to be irradiated with the pulsed laser light L11 reflected by the beam splitter 91. The two pinholes 92*a* and 92*b* of the double pinhole 92 may be provided with the predetermined pinhole spacing X in the H-axis direction of the pulsed laser light L11. The predetermined pinhole spacing X may satisfy a relationship of X=P/M, where P is an array pitch in the H-axis direction in the fly-eye lens 72 in the annealing apparatus 12 and M is an expansion magnification in the H-axis direction of the beam expander 70.

In the coherence monitor 9, the interference fringe contrast C on the irradiation object 76 to be subjected to annealing by the annealing apparatus 12 may be estimated by measurement of the interference fringe contrast C in the H-axis direction.

(6.4 Variation of Discharge Electrodes)

Figure 28:
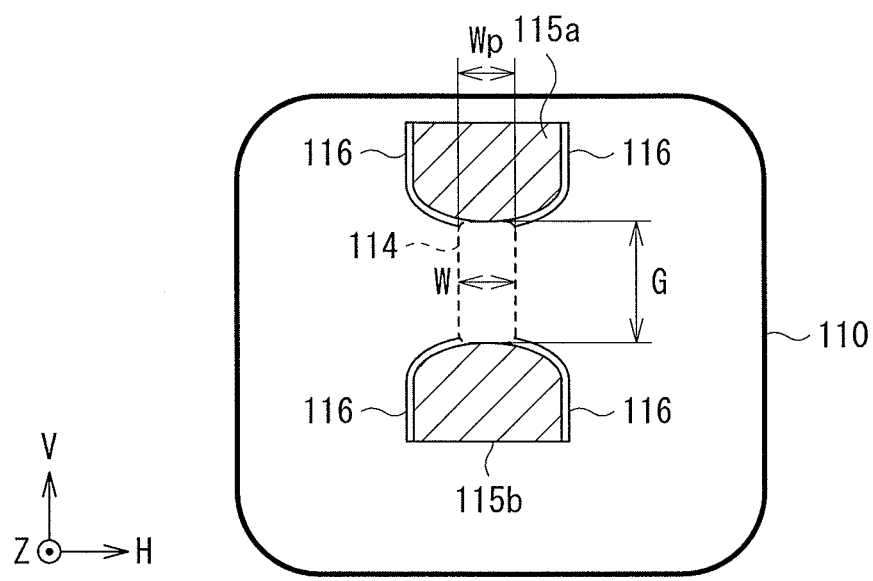
FIG. 28 schematically illustrates an example of a variation of discharge electrodes.

FIG. 28 schematically illustrates an example of a variation of the discharge electrodes.

The chamber 110 may include a pair of discharge electrodes 115*a* and 115*b* illustrated in FIG. 28 in place of the pair of discharge electrodes 113*a* and 113*b* illustrated in FIG. 3. Each of the discharge electrodes 115*a* and 115*b* may have a curved surface. The surface of each of the discharge electrodes 115*a* and 115*b* may be coated in part with an electrical insulator 116.

A portion other than a discharge surface of each of the discharge electrodes 115*a* and 115*b* may be coated with the electrical insulator 116 so as to cause discharge with a predetermined discharge width W. Coating with the electrical insulator 116 may be performed by spraying alumina to the surfaces of the discharge electrodes 115*a* and 115*b*. As a result, discharge may be caused with the discharge width W that is substantially equal to an electrode width Wp of a portion to which the electrical insulator 116 is not sprayed.

[7. Hardware Environment of Controller]

A person skilled in the art will appreciate that a general-purpose computer or a programmable controller may be combined with a program module or a software application to execute any subject matter disclosed herein. The program module, in general, may include one or more of a routine, a program, a component, a data structure, and so forth that each causes any process described in any example embodiment of the present disclosure to be executed.

Figure 29:
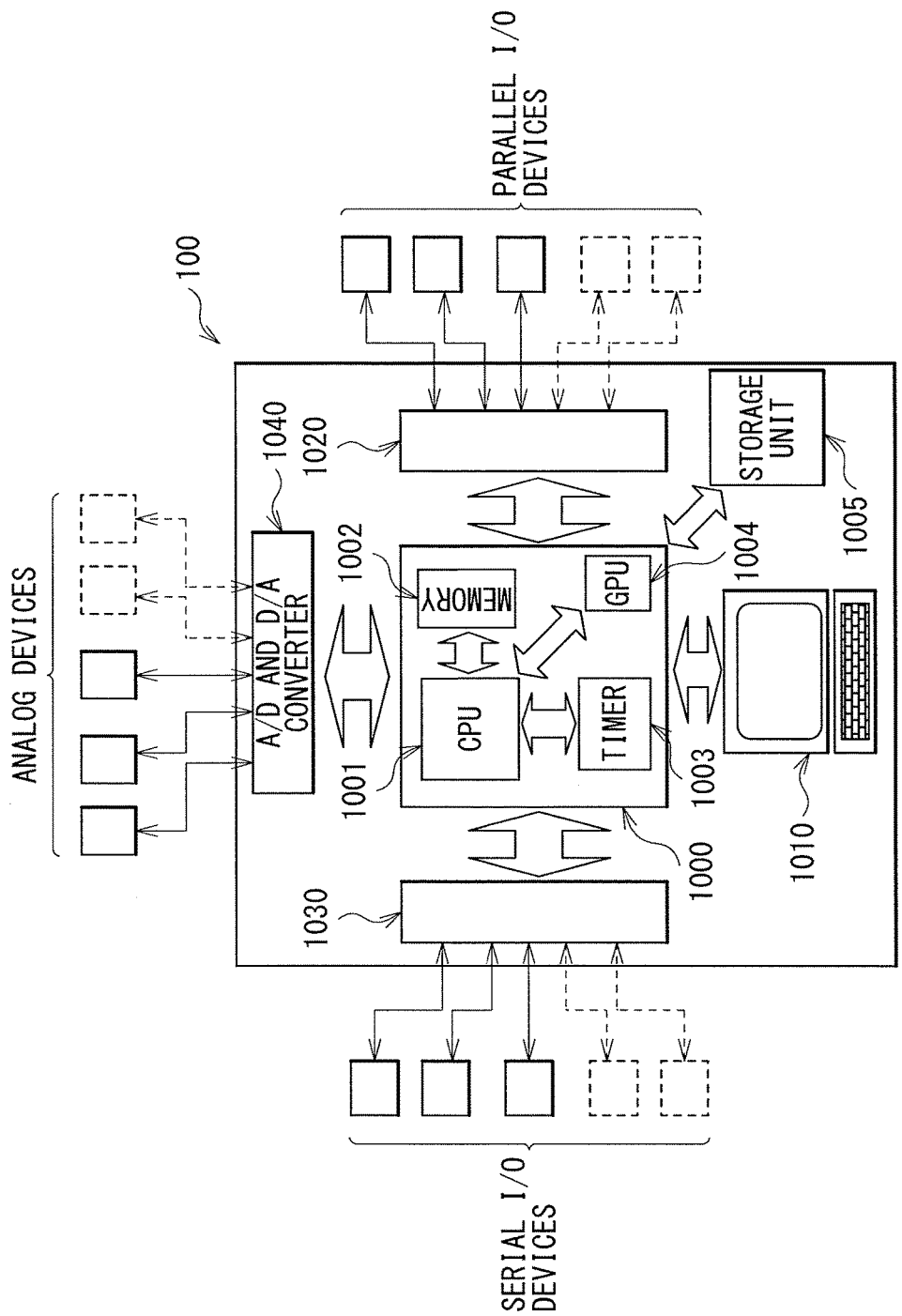
FIG. 29 illustrates an example of a hardware environment of a controller.

FIG. 29 is a block diagram illustrating an exemplary hardware environment in which various aspects of any subject matter disclosed therein may be executed. An exemplary hardware environment 100 in FIG. 29 may include a processing unit 1000, a storage unit 1005, a user interface 1010, a parallel input/output (I/O) controller 1020, a serial I/O controller 1030, and an analog-to-digital (A/D) and digital-to-analog (D/A) converter 1040. Note that the configuration of the hardware environment 100 is not limited thereto.

The processing unit 1000 may include a central processing unit (CPU) 1001, a memory 1002, a timer 1003, and a graphics processing unit (GPU) 1004. The memory 1002 may include a random access memory (RAM) and a read only memory (ROM). The CPU 1001 may be any commercially-available processor. A dual microprocessor or any other multi-processor architecture may be used as the CPU 1001.

The components illustrated in FIG. 29 may be coupled to one another to execute any process described in any example embodiment of the present disclosure.

Upon operation, the processing unit 1000 may load programs stored in the storage unit 1005 to execute the loaded programs. The processing unit 1000 may read data from the storage unit 1005 together with the programs, and may write data in the storage unit 1005. The CPU 1001 may execute the programs loaded from the storage unit 1005. The memory 1002 may be a work area in which programs to be executed by the CPU 1001 and data to be used for operation of the CPU 1001 are held temporarily. The timer 1003 may measure time intervals to output a result of the measurement to the CPU 1001 in accordance with the execution of the programs. The GPU 1004 may process image data in accordance with the programs loaded from the storage unit 1005, and may output the processed image data to the CPU 1001.

The parallel I/O controller 1020 may be coupled to parallel I/O devices operable to perform communication with the processing unit 1000, and may control the communication performed between the processing unit 1000 and the parallel I/O devices. Non-limiting examples of the parallel I/O devices may include the uniaxial stages 43 and 46, the exit port shutter 95, the laser controller 11, and the annealing controller 13. The serial I/O controller 1030 may be coupled to a plurality of serial I/O devices operable to perform communication with the processing unit 1000, and may control the communication performed between the processing unit 1000 and the serial I/O devices. Non-limiting examples of serial I/O devices may include the laser controller 11 and the annealing controller 13. The A/D and D/A converter 1040 may be coupled to various kinds of sensors and analog devices through respective analog ports. Non-limiting examples of the analog devices may include the CCD camera 94. The A/D and D/A converter 1040 may control communication performed between the processing unit 1000 and the analog devices, and may perform analog-to-digital conversion and digital-to-analog conversion of contents of the communication.

The user interface 1010 may provide an operator with display showing a progress of the execution of the programs executed by the processing unit 1000, such that the operator is able to instruct the processing unit 1000 to stop execution of the programs or to execute an interruption routine.

The exemplary hardware environment 100 may be applied to one or more of configurations of the annealing controller 13 and other controllers according to any example embodiment of the present disclosure. A person skilled in the art will appreciate that such controllers may be executed in a distributed computing environment, namely, in an environment where tasks may be performed by processing units linked through any communication network. In any example embodiment of the present disclosure, controllers such as the annealing controller 13 may be coupled to one another through a communication network such as Ethernet (Registered Trademark) or the Internet. In the distributed computing environment, the program module may be stored in each of local and remote memory storage devices.

[8. Et Cetera]

The foregoing description is intended to be merely illustrative rather than limiting. It should therefore be appreciated that variations may be made in example embodiments of the present disclosure by persons skilled in the art without departing from the scope as defined by the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items. Also, the singular forms "a", "an", and "the" used in the specification and the appended claims include plural references unless expressly and unequivocally limited to one referent.

What is claimed is:

1. A laser unit, comprising:
a laser chamber including a pair of discharge electrodes that are opposed to each other in a first direction with an electrode gap interposed in between and are configured to provide a discharge width in a second direction smaller than the electrode gap, the second direction being orthogonal to the first direction;
an optical resonator including a first optical member and a second optical member, and configured to amplify laser light generated between the discharge electrodes and output amplified laser light, the first optical member and the second optical member being opposed to each other in a third direction orthogonal to both the first direction and the second direction with the discharge electrodes interposed in between, the first optical member including a cylindrical convex lens and a cylindrical concave lens;
an adjuster configured to adjust a G parameter of the first optical member by adjusting a combined focal length of the cylindrical convex lens and the cylindrical concave lens;
a coherence monitor provided in an optical path of the amplified laser light outputted from the optical resonator, and configured to measure spatial coherence in the second direction of the amplified laser light; and
a controller configured to control the adjuster on a basis of a measurement value derived from the coherence monitor such that the optical resonator satisfies the following expression to configure a stable resonator in the second direction:

$0 < G1 \cdot G2 < 1$ where G1 is the G parameter of the first optical member, and G2 is a G parameter of the second optical member.

2. The laser unit according to claim 1, wherein the optical resonator further satisfies the following expression:

$0.25 < G1 \cdot G2 < 0.75$.

3. The laser unit according to claim 2, wherein the optical resonator further satisfies the following expression:

$0.45 < G1 \cdot G2 < 0.55$.

4. The laser unit according to claim 1, wherein a value of the G parameter of the second optical member is one.

5. The laser unit according to claim 1, wherein the discharge width is defined as a width in the second direction at a halfway point of the electrode gap.

6. The laser unit according to claim 4, wherein G1 is represented by the following expression:

$G1 = 1 - L/2F$ where L is a resonator length, and F is the combined focal length of the cylindrical convex lens and the cylindrical concave lens.

7. The laser unit according to claim 1, wherein the cylindrical convex lens includes a partial reflection film.

8. The laser unit according to claim 1, wherein the first optical member further includes an output coupling mirror including a partial reflection film.

9. The laser unit according to claim 1, wherein
the second optical member includes a second cylindrical convex lens and a second cylindrical concave lens, and
the adjuster further adjusts the G parameter of the second optical member by adjusting a combined focal length of the second cylindrical convex lens and the second cylindrical concave lens.

10. A laser unit, comprising:
a laser chamber including a pair of discharge electrodes that are opposed to each other in a first direction with an electrode gap interposed in between and are configured to provide a discharge width in a second direction smaller than the electrode gap, the second direction being orthogonal to the first direction;
an optical resonator including a first optical member and a second optical member, and configured to amplify laser light generated between the discharge electrodes and output amplified laser light through the first optical member, the first optical member and the second optical member being opposed to each other in a third direction orthogonal to both the first direction and the second direction with the discharge electrodes interposed in between, the second optical member including a cylindrical convex lens and a cylindrical concave lens;
an adjuster configured to adjust a G parameter of the second optical member by adjusting a combined focal length of the cylindrical convex lens and the cylindrical concave lens;
a coherence monitor provided in an optical path of the amplified laser light outputted from the optical resonator, and configured to measure spatial coherence in the second direction of the amplified laser light; and
a controller configured to control the adjuster on a basis of a measurement value derived from the coherence monitor such that the optical resonator satisfies the following expression to configure a stable resonator in the second direction:

$0 < G1 \cdot G2 < 1$ where G1 is a G parameter of the first optical member, and G2 is the G parameter of the second optical member.

11. The laser unit according to claim 10, wherein the optical resonator further satisfies the following expression:

$0.25 < G1 \cdot G2 < 0.75$.

12. The laser unit according to claim 11, wherein the optical resonator further satisfies the following expression:

$0.45 < G1 \cdot G2 < 0.55$.

13. The laser unit according to claim 10, wherein a value of the G parameter of the first optical member is one.

14. The laser unit according to claim 13, wherein G2 is represented by the following expression:

$G2 = 1 - L/2F$ where L is a resonator length, and F is the combined focal length of the cylindrical convex lens and the cylindrical concave lens.

15. The laser unit according to claim 10, wherein the discharge width is defined as a width in the second direction at a halfway point of the electrode gap.

16. The laser unit according to claim 10, wherein the cylindrical convex lens includes a high reflection film.

17. The laser unit according to claim 10, wherein the second optical member further includes a rear mirror including a high reflection film.

* * * * *